(12) United States Patent
Mogi et al.

(10) Patent No.: US 6,687,724 B1
(45) Date of Patent: Feb. 3, 2004

(54) INFORMATION PROCESSOR

(75) Inventors: Yukihiko Mogi, Kanagawa (JP);
Kazuhiko Nishibori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/564,279

(22) Filed: May 4, 2000

(30) Foreign Application Priority Data

May 7, 1999 (JP) .......................................... 11-127340

(51) Int. Cl.[7] ................................................ G06F 7/00
(52) U.S. Cl. ..................................................... 708/490
(58) Field of Search ................................ 708/490, 495, 708/496, 497, 498, 501, 603, 620; 712/300

(56) References Cited

U.S. PATENT DOCUMENTS 4,745,569 A * 5/1988 Yamaoka et al. ............ 708/623
6,115,812 A * 9/2000 Abdallah et al. ............ 712/300
6,145,077 A * 11/2000 Sidwell et al. .............. 712/300
6,237,016 B1 * 5/2001 Fischer et al. .............. 708/622

* cited by examiner

*Primary Examiner*—Chuong Dinh Ngo
(74) *Attorney, Agent, or Firm*—Sonnenschein, Nath & Rosenthal LLP

(57) ABSTRACT

An information processor 1 used as a processor in a personal computer for example includes an inner-product operational unit 3 which effects an SIMD type inner-product operation. The result of the inner-product operation effected in the inner-product operational unit 3 is stored into a P register 15 in the form of a word. A shift and shifting unit 16 reads the result of the inner-product operation stored in the P register 15, shifts the result by an arbitrary number of bits and then clips it with the arbitrary number of bits, and stores the result into a Y register 17 as a sub-word.

21 Claims, 31 Drawing Sheets

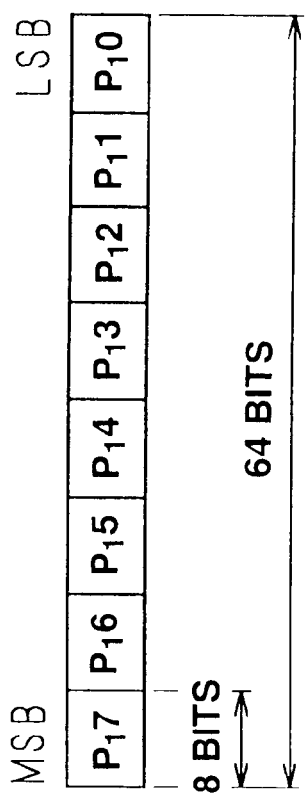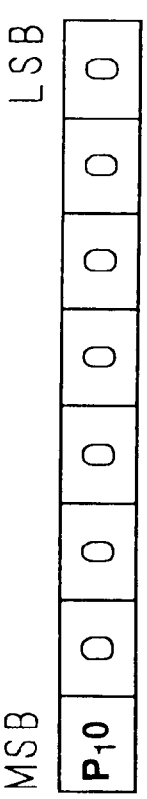
FIG.8A P REGISTER
FIG.8B RIGHTWARD SHIFT BY 0 BIT
FIG.8C CLIP TO 8-BIT LENGTH
FIG.8D STORAGE OF 8 BIT-LONG DATA INTO Y REGISTER

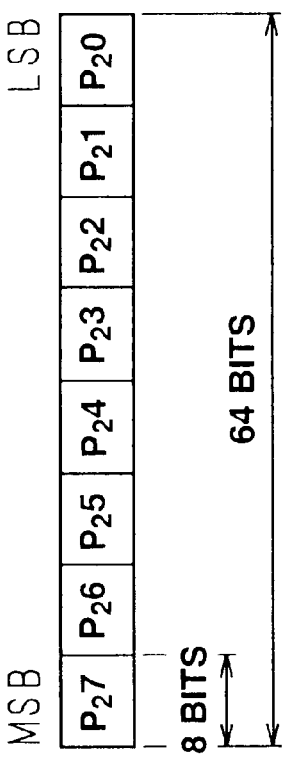
FIG.9A P REGISTER
FIG.9B RIGHTWARD SHIFT BY 8 BITS ※
※ SIGN OF P7
IT IS 0X00 WHEN POSITIVE, AND 0XFF WHEN NEGATIVE
FIG.9C CLIP TO 8-BIT LENGTH
FIG.9D STORAGE OF 8 BIT-LONG DATA INTO Y REGISTER

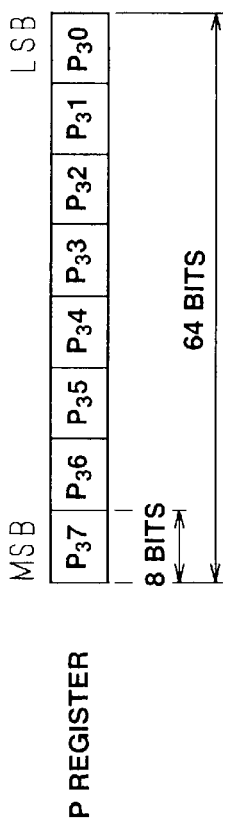

SET.C

| IF | INSTRUCTION FETCH AND DECODE |
|---|---|
| RF | $C \leftarrow reg[m]$ |
| $Ex_A$ | NOP |
| $Ex_B$ | NOP |
| WB | NOP |

FIG.12

SET.CR

| IF | INSTRUCTION FETCH AND DECODE |
|---|---|
| RF | $C \leftarrow reg[m]$ |
| $Ex_A$ | $Y \leftarrow 0$ |
| $Ex_B$ | NOP |
| WB | NOP |

FIG.13

INPROD

| IF | INSTRUCTION FETCH AND DECODE |
|---|---|
| RF | $X_L \leftarrow reg[m]$ |
| $Ex_A$ | $P \leftarrow \sum_{i=0}^{7} C_i \times X_{Li}$ |
| $Ex_B$ | $Y \leftarrow sr(P)$ |
| WB | $reg[n] \leftarrow Y$ |

FIG.14

INPROD.L

| IF | INSTRUCTION FETCH AND DECODE |
|---|---|
| RF | $X_{H,L} \leftarrow reg[m, m+1]$ |
| $Ex_A$ | $P \leftarrow \sum_{i=0}^{7} C_i \times X_{Li}$ |
| $Ex_B$ | $Y_i \leftarrow Y_{i+1} \quad (i=0,\ldots,6)$<br>$Y_7 \leftarrow sr(P)$ |
| WB | $reg[n] \leftarrow Y$ |

FIG.15

INPROD.S

| IF | INSTRUCTION FETCH AND DECODE |
|---|---|
| RF | $X_{Li} \leftarrow X_{Li+1} \quad (i=0,\ldots,6)$<br>$X_{L7} \leftarrow X_{H0}$<br>$X_{Hi} \leftarrow X_{Hi+1} \quad (i=0,\ldots,6)$<br>$X_{H7} \leftarrow 0$ |
| $Ex_A$ | $P \leftarrow \sum_{i=0}^{7} C_i \times X_{Li}$ |
| $Ex_B$ | $Y_i \leftarrow Y_{i+1} \quad (i=0,\ldots,6)$<br>$Y_7 \leftarrow sr(P)$ |
| WB | $reg[n] \leftarrow Y$ |

FIG.16

INFORMATION PROCESSOR

BACKGROUND OF THE INVENTION

1. Field of the Invention

The present invention relates to an information processor used to process data, such as a general-purpose processor, central processing unit (CPU), media processor, digital signal processor (DSP) or the like.

2. Description of the Related Art

For use with the multimedia having been spreading, processors to process digital data such as CPU, DSP, etc. have been proposed which have to effect a digital-filter operation more frequently. Since the digital-filter operation is an inner-product operation, it is effected using the following arithmetic expression:

$$\sum_{i=0}^{n} Ci \times Xi \qquad (1)$$

For an effective inner-product operation, the recent CPU, DSP, etc. incorporate a multiply and accumulate (MAC) unit. The construction of a CPU incorporating an MAC unit is shown in FIG. 1.

As shown in FIG. 1, the CPU is generally indicated with a reference 100. The CPU 100 includes a register file 1001 to store a plurality of data, a MAC unit 102 to effect an inner-product operation of the data, shift (SHIFT) unit 103 to shift the data to the right and left, and an arithmetic logic (ALU) unit 104 to effect arithmetic and logical operations of the data. For an inner-product operation by the CPU 100, the data stored in the register file 101 are multiplied and accumulated by the MAC unit 102, and the result of the multiplication and accumulation is stored again into the register file 101. Then, the data stored in the register file 101 is repeatedly multiplied and accumulated by the MAC unit 102 to provide the result of the inner-product operation.

The recent processor used in a work station, personal computer or the like is designed to effect a single-instruction multiple data stream (SIMD) type operation in units of a sub-word for a higher speed of the image processing and sound processing. In the SIMD type operation, a word-long data (one word is 32 or 64 bits long) stored in the register file is divided into a plurality of data each of a predetermined number of bits for arithmetic operation. Each of the data resulted from the division of a word-long data is called "sub-word".

The digital-filter operation, that is, inner-product operation, can be done faster by the combination of a division of a data into sub-words with an inner-product operational unit which effects the SIMD type operation. The digital-filter operation is used for image processing and sound processing among others. It is continuously effected on a series of data in many cases. Thus, to effect a digital-filter operation by the SIMD type operation, a source data to be calculated and a coefficient data by which the source data is multiplied are stored in units of a sub-word into an input register of the inner-product operational unit.

A typical inner-product operation of the SIMD type will be explained below with reference to FIG. 2. The input register of the inner-product operational unit is supplied with a 64-bit source data and 64-bit coefficient data, for example, in units of a 16-bit sub-word, respectively. The source data consisting of four 16-bit sub-words $X_0$, $X_1$, $X_2$ and $X_3$ counted from the least significant bit (LSB) is stored into a first input register 111. The coefficient data consisting of four 16-bit sub-words $C_0$, $C_1$, $C_2$ and $C_3$ counted from the most significant bit (MSB) is stored into a second input register 112. The inner-product operational unit multiplies and accumulates the source data consisting of the four 16-bit sub-words and coefficient data correspondingly consisting of four 16-bit sub-words, on a multiply and accumulate (MAC) instruction (pmaddwd), and stores the result of the multiplication and accumulation (product-sum) into a first intermediate register 113. $X_2 \times C_2 + X_3 \times C_3$ is stored as the result of the multiplication and accumulation at the higher 32 bits (two sub-words) in the first intermediate register 113 while $X_0 \times C_0 + X_1 \times C_1$ is stored as the result of the multiplication and accumulation at the lower 32 bits (two sub-words) in the first intermediate register 113, as shown in FIG. 2. Next, on a data-transfer instruction (movq), the inner-product operational unit copies the content of the first intermediate register 113 to a second intermediate register 114. Then, on a shift instruction (psrlq), the inner-product operational unit shifts to the right the data in the first intermediate register 113 by one sub-word, that is, by 32 bits (namely, shifts the data from the higher place to the lower place). Further, on an add instruction (paddd), the inner-product operational unit adds the higher 32 bits and lower 32 bits in the first and second intermediate registers 113 and 114, and stores the result of the addition at the higher 32 bits and lower 32 bits, respectively, in an output register 115.

As the result of the arithmetic operation, $X_0 \times C_0 + X_1 \times C_1 + X_2 \times C_2 + X_3 \times C_3$, the result of the inner-production operation by the SIMD type operation, is stored at the lower 32 bits in the output register 115. Note that the data stored at the higher 32 bits in the output register 115 are independent of the inner-product operation.

The processor used in the work station, personal computer, etc., has to frequently effect a continuous digital-filter operation of a source data such as a series of images, sounds, etc. In this case, for such a continuous digital-filter operation, there are provided a plurality of input registers having stored therein coefficient data shifted by a sub-word from each other, and a source-data input register. The coefficient data whose bit positions have been shifted are read from each of the coefficient-data input registers each time an inner-product operation instruction is issued, and a source data whose bit positions are fixed is multiplied by a coefficient data of which the bit positions have been shifted, thereby permitting the digital-filter operation to be done at a high speed. Also, there are provided a coefficient-data input register and a source-data input data constructed as a shift register capable of storing a two-word data, a source data of which the bit positions have been shifted each by one sub-word is read each time an inner-product operation instruction is issued, and a coefficient data of which the bit positions are fixed is multiplied by a source data of which the bit positions have been shifted, thereby permitting the digital-filter operation to be done at a high speed.

The inner-product operation has been described in the foregoing. The SIMD type operation can be done for the arithmetic and logical operations by the common ALU such as addition, subtraction, etc. as well.

However, the above-mentioned arithmetic operation is disadvantageous as will be described below:

For example, when a series of arithmetic operations is done, the results of the operations are stored in a plurality of intermediate registers and output register. That is, many registers are required for this data storage.

Also, even with an arithmetic operation done by the SIMD type one, the result of the operation will be given in units of a word, not in units of a sub-word in which the data has been stored into the input register. Thus, when the SIMD type operation is continuously done, a word-long source data has to be re-formed into sub-words by shifting the bit positions of the output data and packing the data, which will lead to an increased number of cycles of operation. In addition, the number of program codes will be increased and the program memory will be increased in size.

OBJECT AND SUMMARY OF THE INVENTION

It is therefore an object of the present invention to overcome the above-mentioned drawbacks of the prior art by providing an information processor in which the result of an arithmetic operation can be provided as sub-words each having an arbitrary data length and thus the operation can be completed with a reduced number of execution cycles.

According to the present invention, there is provided an information processor including:

an arithmetic circuit to provide a result of arithmetic operation in units of a word length;

an intermediate register to store the result of arithmetic operation supplied from the arithmetic circuit;

a shifting circuit to shift the data stored in the intermediate register by an arbitrary number of bits;

a clipping circuit to clip the data shifted by the shifting circuit to an arbitrary bit length; and an output register to store as a sub-word the data clipped by the clipping circuit and sequentially shift the existing data therein by one sub-word from the higher to lower bits each time a data is entered for storage as a sub-word.

In the above information processor, the result of arithmetic operation, provided in units of the word length from the inner word unit, is shifted in bit position and then clipped, and the result of the shift and clipping is stored into the output register as a sub-word. Namely, the result of the arithimetic operation effected in the arithmetic circuit is not written once into any external buffer such as a register file or the like, but is directly shifted in bit position and then clipped.

According to the present invention, there is also provided an information processor including:

an input register to store a source data divided in sub-words;

a coefficient register to store a coefficient data divided in sub-words;

an inner-product operational unit to effect an inner-product operation of the source data stored in the input register and coefficient data stored in the coefficient register, in units of a sub-word, and provide the result of the operation in units of a word length;

an intermediate register to store the result of the operation effected in the inner-product operational unit;

a shifting unit to shift the data stored in the intermediate register by an arbitrary number of bits;

a clipping circuit to clip the data of which the bit positions have been shifted by the shifting circuit to an arbitrary bit length; and an output register to store as a sub-word the data clipped by the clipping circuit, and sequentially shift the existing data therein by one sub-word from the higher to lower bits each time a data is entered for storage as a sub-word.

In the above information processor, the result of inner-product operation, provided in units of the word length from the inner-product operational unit, is shifted in bit position and then clipped, and the result of the shift and clipping is stored into the output register as a sub-word. Namely, the result of the arithmetic operation effected in the inner-product operational unit is not written once into any external buffer such as a register file or the like, but is directly shifted in bit position and clipped.

According to the present invention, there is also provided an information processor including:

an arithmetic circuit to provide the result of an arithmetic operation in units of a word length; and an output register to store the result of the arithmetic operation effected in the arithmetic circuit as a sub-word and sequentially shift the existing data therein from the higher to lower bits in units of a sub-word each time a data is entered for storage as a sub-word.

According to the present invention, there is also provided an information processor including:

an input register to store a source data divided in sub-words;

a coefficient register to store a coefficient data divided in sub-words;

an inner-product operational unit to effect an SIMD type inner-product operation, in units of a sub-word, of the source data stored in the input register and coefficient data stored in the coefficient register, and provide the result of the SIMD type inner-product operation in units of a word length; and an output register to store as a sub-word the result of the SIMD type inner-product operation effected in the inner-product operational unit and sequentially shift the existing data therein from the higher to lower bits in units of a sub-word each time a data is entered for storage as a sub-word.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIGS. 8A, 8B, 8C and 8D explain how the shift and clipping unit of the information processor works;

In FIGS. 9A, 9B, 9C and 9D explain how the shift and clipping unit works as the operation goes forward from the status shown in FIGS. 8A, 8B, 8C and 8D;

FIGS. 10A, 10B, 10C and 10D explain how the shift and clipping unit works as the operation goes forward from the status shown in FIGS. 9A, 9B, 9C and 9D;

FIG. 11 explains the pipeline processing adopted in the information processor;

FIG. 12 explains how an instruction (SET. C) used in the information processor is processed;

FIG. 13 explains how an instruction (SET. CR) used in the information processor is processed;

FIG. 14 explains how an instruction (INPROD) used in the information processor is processed;

FIG. 15 explains how an instruction (INPROD. L) used in the information processor is processed;

FIG. 16 explains how an instruction (INPROD. S) used in the information processor is processed;

DETAILED DESCRIPTION OF THE PREFERRED EMBODIMENTS

The embodiment of the information processor according to the present invention is typically used as a processor in a work station, personal computer and the like.

Figure 1:
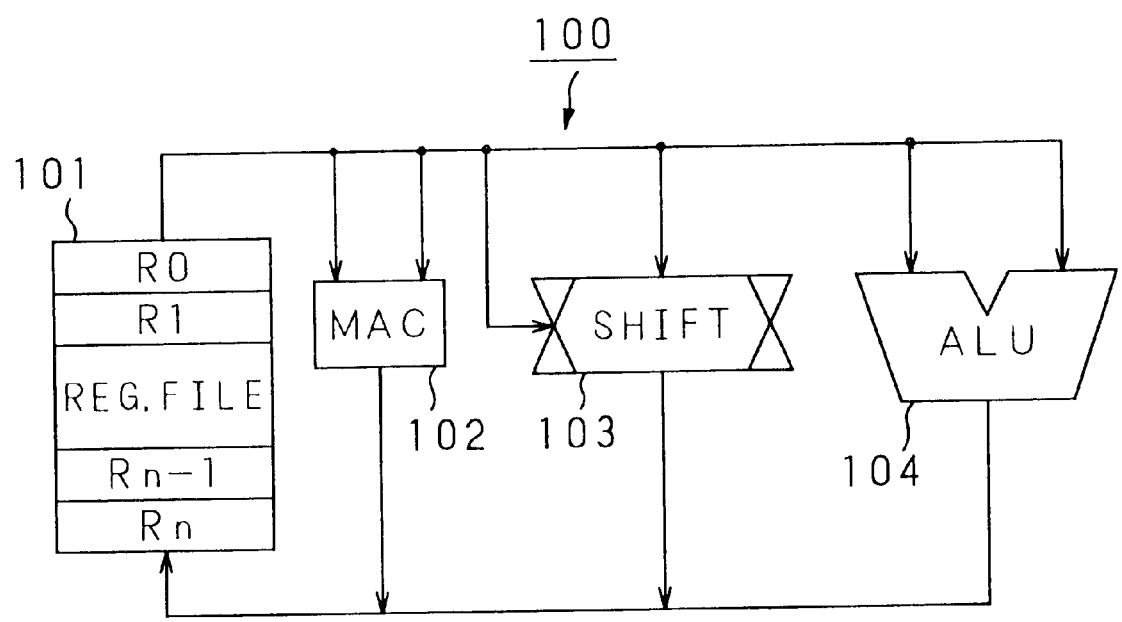
FIG. 1 is a block diagram of a conventional CPU.
Figure 2:
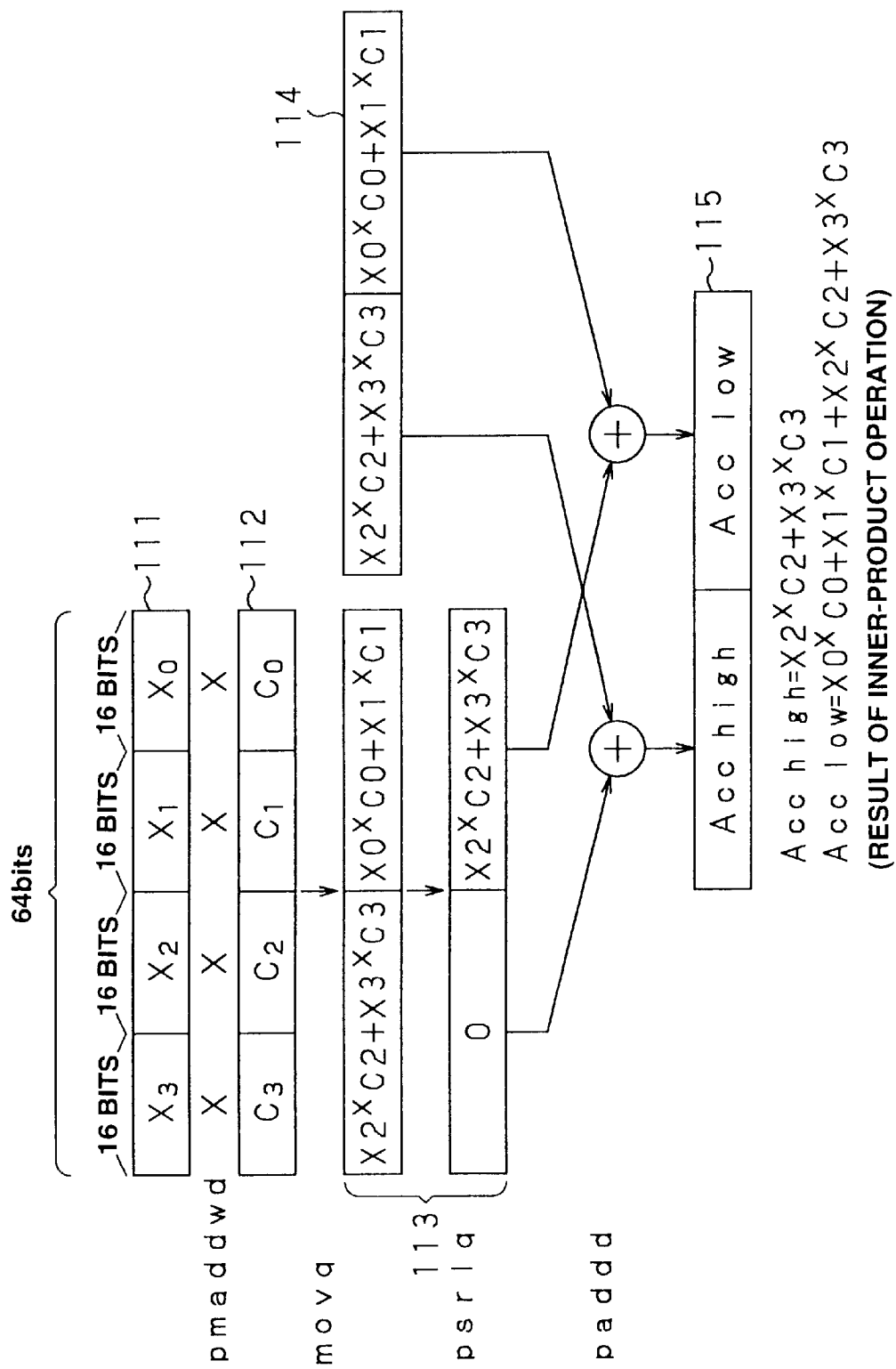
FIG. 2 explains how the SIMD type inner-product operation is done.
Figure 3:
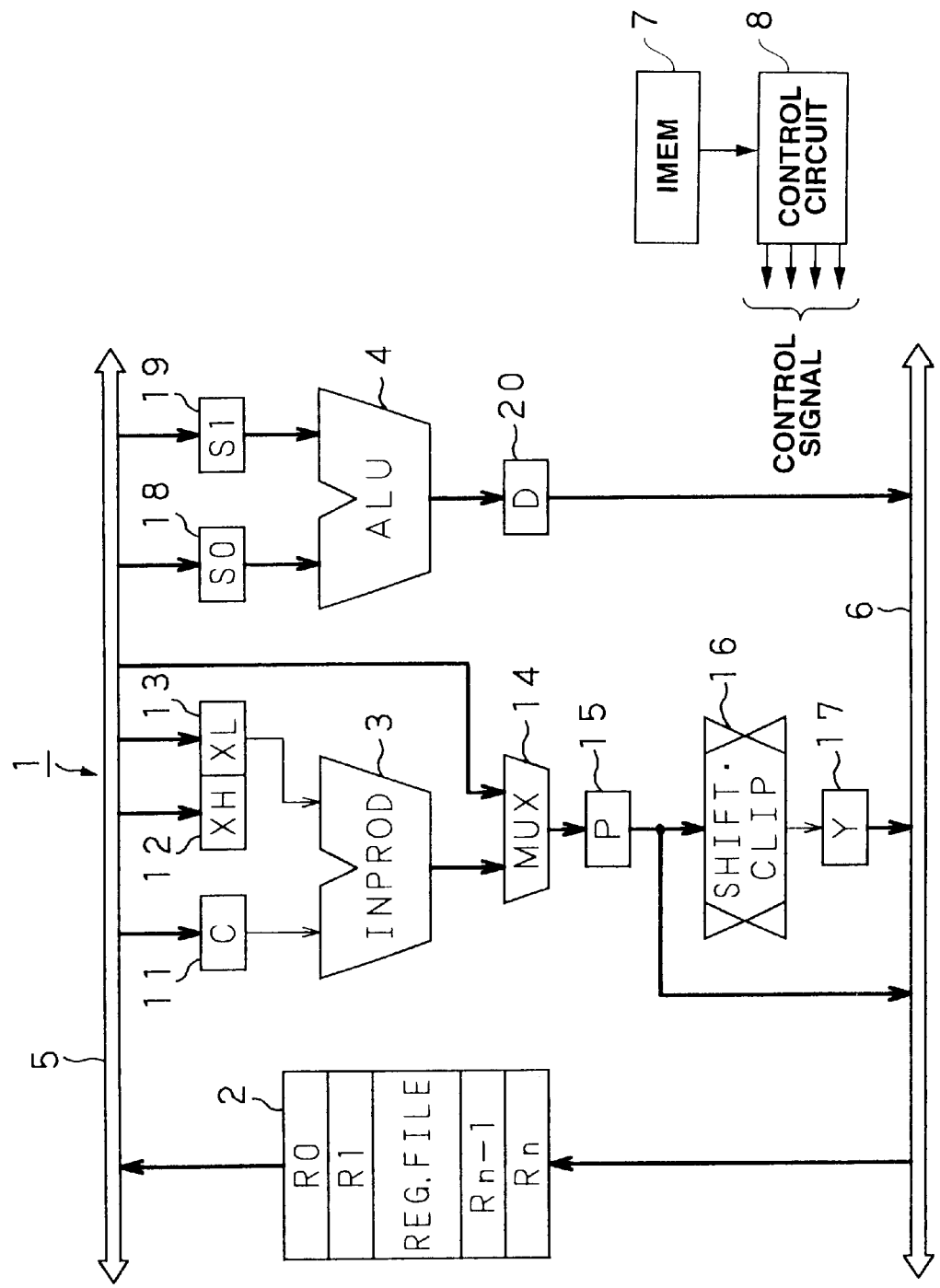
FIG. 3 is a block diagram of the information processing unit according to the present invention.

Referring now to FIG. 3, there is illustrated in the form of a block diagram the embodiment of the information processor according to the present invention. The information processor is generally indicated with a reference 1. As shown, it includes a register filer 2 to store a plurality of word in units of a word length (for example, 64 bits), an inner-product operational (INPROD) unit 3 to make an inner-product operation of the data, an arithmetic logic unit (ALU) 4 to make arithmetic and logical operations of the data, a first data transfer bus 5 to transfer the data stored in the register filer 2 to each register, a second data transfer bus 6 to transfer the data stored in each register to the register file 2, an instruction memory (IMEM) 7 to store an instruction for supply to each of the units, and a control circuit 8 to generate a control signal based on the instruction stored in the IMEM 7 and control each of the units with the control signal.

The information processor 1 includes also, as input registers for the INPROD unit 3, a coefficient register © register) 11 adapted to store a word-long coefficient data divided in sub-words, a higher input register (XH register) 12 adapted to store a word-length source data divided in sub-words, and a lower input register (XL register) 13 adapted to store a word-long source data divided in sub-words.

The information processor 1 further includes a multiplexer 14 to make a selection between a data provided as the result of the operation from the INPROD unit 3 and a data transferred from the register file 2 via the first data transfer but 5, and an intermediate register (P register) 15 to store the data selected by the multiplexer 14 in units of a word length.

In addition, the information processor 1 includes a shifting·clipping (SHIFT·CLIP) unit 16 to shift anc clip the word-length data stored in the P register 15 to a data in units of a sub-word, and an output register (Y register) 17 to store the data shifted and clipped by the SHIFT·CLIP unit 16.

Moreover, the information processor 1 includes, as input registers for the ALU 4, a first input register (S0 register) 18 adapted to store a word-long source data divided in sub-words, and a second input register (S1 register) 19 adapted to store a word-long source data divided in sub-words, and in addition, as an output register for the ALU 4, an output register (D register) 20.

The register file 2 stores a data transferred from an external memory and a data processed by the information processor 1, in units of a word length (for example, 64 bits). The register file 2 has addresses R0 to Rn and stores a plurality of data at the addresses, respectively. At a stage of data write to the buffer, the register filer 2 stores a data transferred from the P, Y and D registers 15, 17 and 20 via the second data transfer bus 6. At a stage of data fetch from the registers, data is read out of the register file 2 and transferred to the C, XH, XL, S0 and S1 registers 11, 12, 13, 18 and 19 via the first data transfer bus 5.

At a stage of execution, the INPROD unit 3 makes an inner-production operation of a coefficient data in the C register 11 and a source data in the XL register 13. Depending upon a supplied operational instruction, the INPROD unit 3 makes either an SIMD type inner-product operation or an inner-product operation in units of an ordinary word length.

On a supplied instruction, the ALU 4 effects any one of various arithmetic and logical operations such as addition, subtraction, etc. of a source data in the S0 and S1 registers 18 and 19 at the stage of execution. The ALU 4 makes either an SIMD type inner-product operation or an inner-product operation in units of an ordinary word length, depending upon the supplied instruction.

Figure 4:
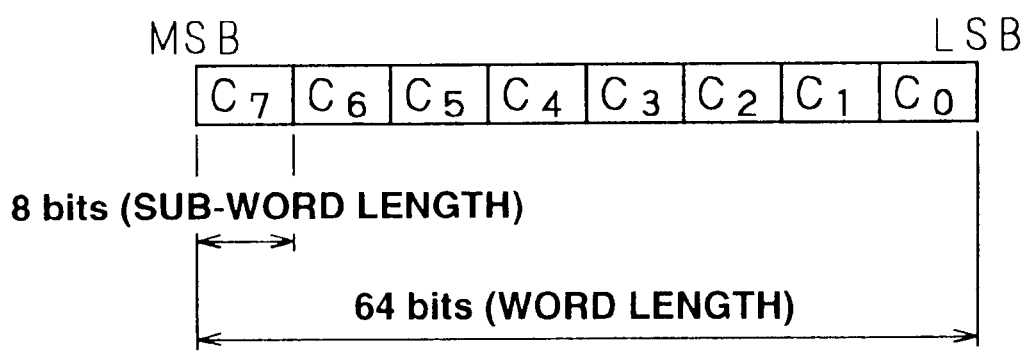
FIG. 4 explains the construction of the coefficient register of the information processing unit.

The word-long C register 11 will store a coefficient data divided in sub-words. Assume here that the word length is 64 bits, for example. In this case, the C register 11 will store a coefficient data divided in sub-words C0, C1, C2, C3, C4, C5, C6 and C7 each of 8 bits (one byte) in length, counted from the LSB as shown in FIG. 4. The coefficient data stored in the C register 11 is read out by the INPROD unit 3 and subjected along with a source data from the XL register 13 to an inner-product operation.

Figure 5A:
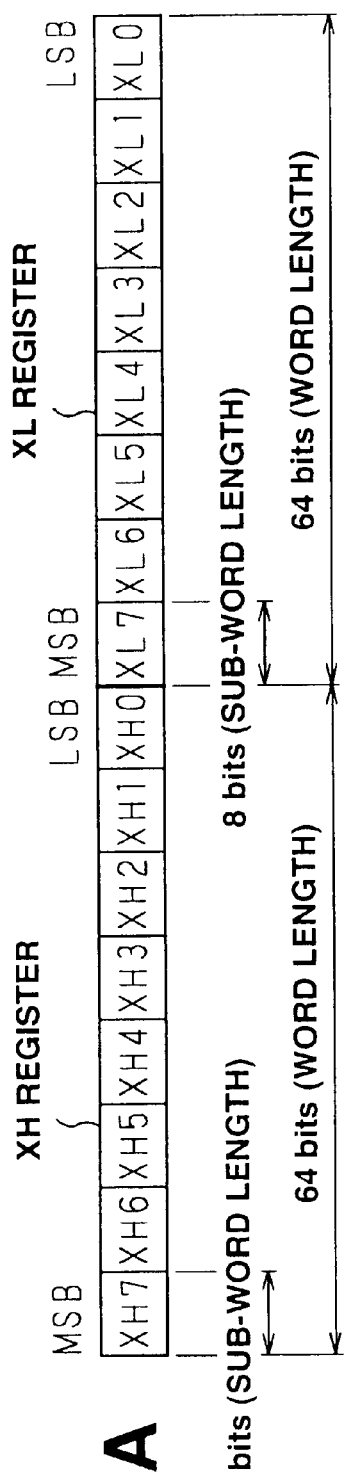
FIGS. 5A, 5B and 5C explain the construction of the higher input register, lower input register and shift register of the information processing unit.

The XH and XL registers 12 and 13, each for data storage in units of a word length, will store a source data divided in sub-words. Assume here that the word length is 64 bits, for example. In this case, the XH register 12 will store a source data divided in sub-words XH0, XH1, XH2, XH3, XH4, XH5, XH6 and XH7 each of 8 bits (one byte) in length, counted from the LSB as shown in FIG. 5A. Also, the XL register 13 will store a source data divided in sub-words XL0, XL1, XL2, XL3, XL4, XL5, XL6 and XL7 each of 8 bits (one byte) in length, counted from the LSB as shown in FIG. 5A.

Figure 5B:
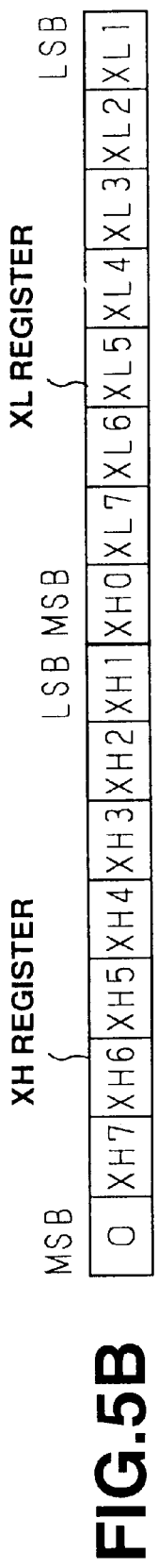
Figure 5C:
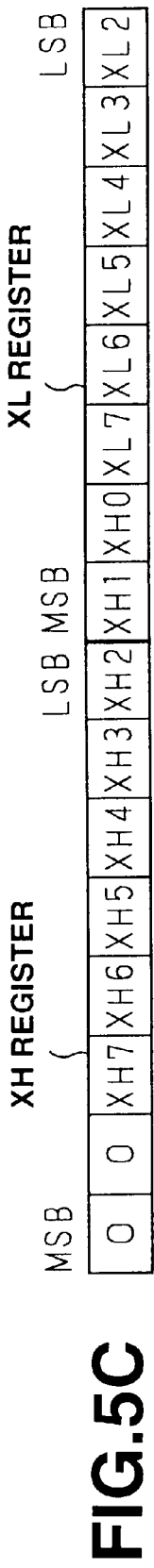

The XH and XL registers 12 and 13 are designed to word as a shift register to shift a source data stored therein sequentially by a sub-word to the right (from the higher to lower bits) each time the INPROD unit 3 makes an SIMD type inner-production operation. In the XH and XL registers 12 and 13, the least significant bit (LSB) of the XH register 12 is connected to the most significant bit (MSB). When a source data is shifted by a sub-word to the right, a source data at the LSB of the XH register 12 is stored at the MSB of the XL register 13. More specifically, when the source data is shifted by one sub-word from the higher to lower bit, starting at the status shown in FIG. 5A, zero (0) will be stored at the LSB of the XH register 12 while a sub-word XH0 stored at the LSB of the XH register 12 will be stored at the MSB of the XL register 13, as shown in FIG. 5B. When the data is shifted by a further one sub-word from the higher to lower bit, starting at the status shown in FIG. 5B, zero will be stored at the MSB of the XH register 12 while a sub-word XH1 stored at the LSB of the XH register 12 will be stored at the MSB of the XL register 13, as shown in FIG. 5C.

Figure 6:
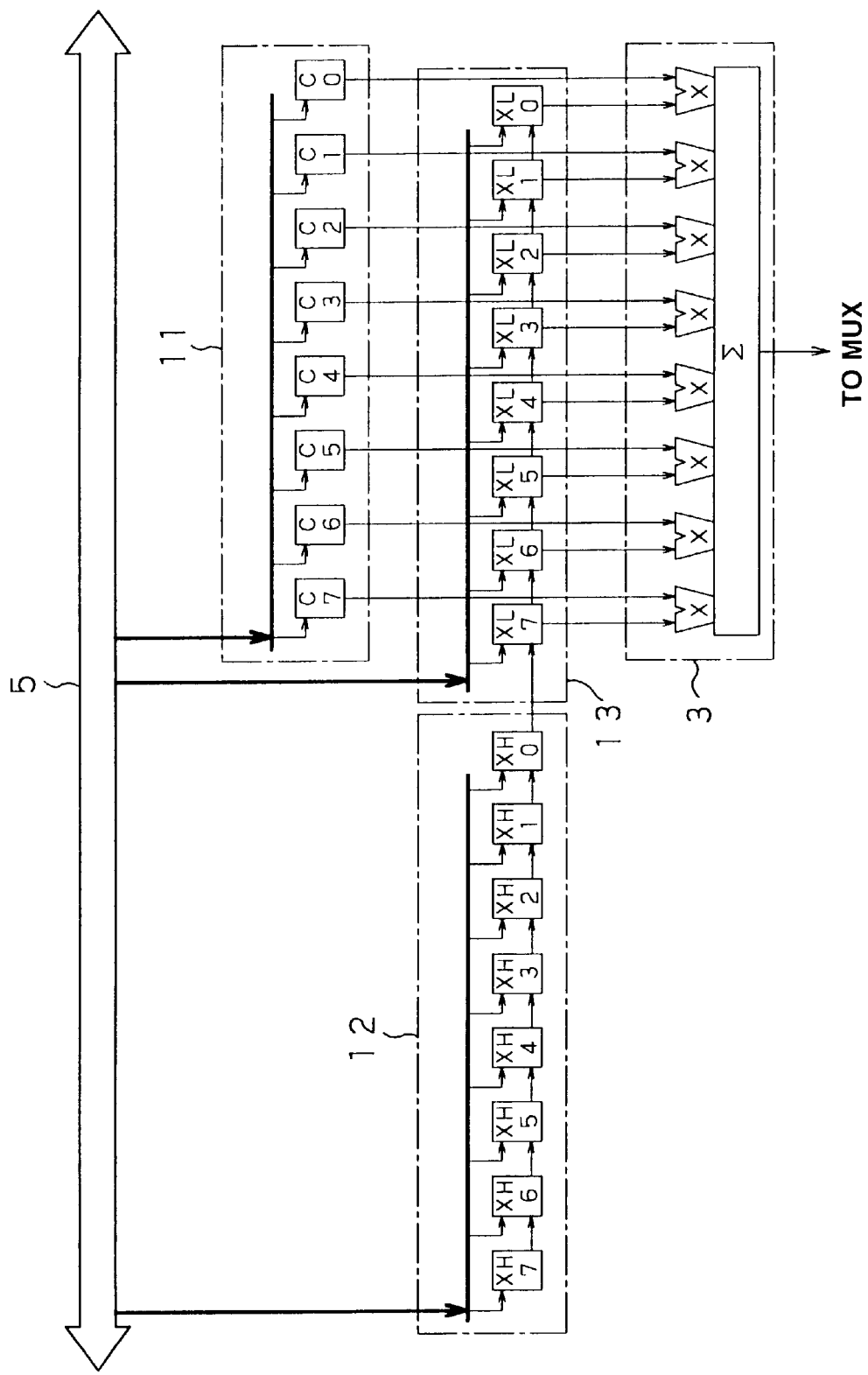
FIG. 6 explains the construction of the higher input register, lower register, coefficient register and inner-product operational unit of the information processor.

The source data thus stored in the XH and XL registers 12 and 13 are read out in units of a sub-word for an SIMD type inner-product operation. More particularly, the relation between the coefficient register 11, XH and XL registers 12 and 13 and the INPROD unit 3 is shown in FIG. 6. In FIG. 6, a route along which a word-long data is transferred is indicated with a thick line while a route along which a sub-word-long data is transferred is indicated with a thin line. Note that when only one SIMD type inner-product operation is done of such data, the data is read only from the XL register 13 positioned at the lower position sub-word by sub-word.

The INPROD unit 3 for which the XH and XL registers 12 and 13 and the C register 11 are provided as input registers can provide a digital-filter operation with a predetermined number of taps which depends upon a number of bytes in the sub-word. When each sub-word in both a coefficient data and source data is 1 byte in size, for example, the INPROD unit 3 can make a digital-filter operation with 8 taps. When each sub-word in either the coefficient or source data has a size of 2 bytes, the INPROD unit 3 can make a digital-filter operation with 4 taps. When each sub-word in either the coefficient or source data has a size of 4 bytes, the INPROD unit 3 can make a digital-filter operation with 2 taps. For a digital-filter operation with a larger number of taps, increasing the capacity of each of the C register 11 and the XH and XL registers 12 and 13 by 64 bits makes it possible for the INPROD unit 3 to make a digital-filter operation with 16 taps when each sub-word in both the coefficient and source data has a size of 1 byte. Thus, the INPROD unit 3 can make a digital-filter operation with 8 taps when the sub-word is 2 bytes in size, a digital-filter operation with 4 taps when the sub-word is 4 bytes in size, and also a digital-filter operation with 2 taps when the sub-word is 8 bytes in size.

The P register 15 is supplied with the result of operation from the INPROD unit 3 or a data transferred from the register file 2 for the purpose of a shift operation, via the multiplexer 14. The P register 15 will store the data in units of a word length. The data thus stored in the P register 15 will be transferred directly to the register file 2 or read by the SHIFT·CLIP unit 16.

The SHIFT·CLIP unit 16 will read a word-long data from the P register 15, shift the read data by an arbitrary number of bits and then clip the shifted data to a data of an arbitrary number of bits.

Figure 7:
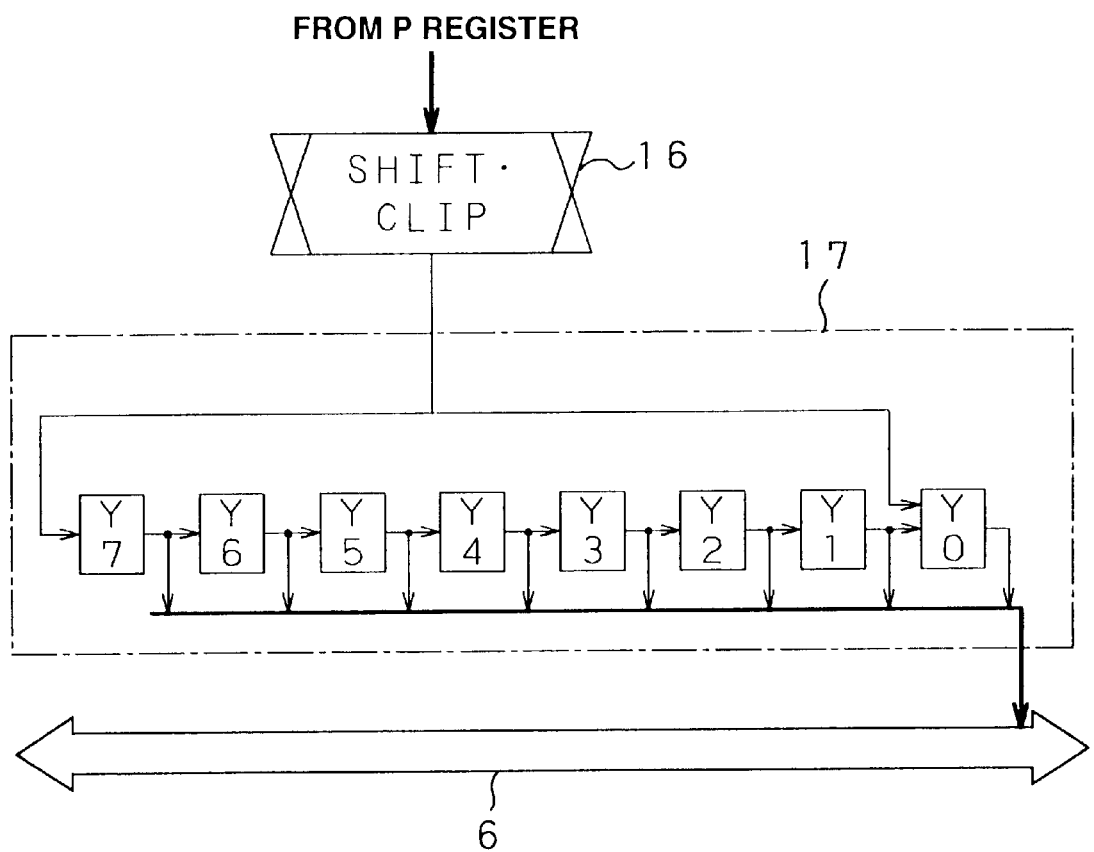
FIG. 7 explains the construction of the output register of the information processor.

The Y register 17 is a word-long register to store an output from the SHIFT·CLIP unit 16. It has a shift-register structure. More particularly, the Y register 17 has sub-registers Y7 to Y0 connected in series to each other and of which stores a sub-word-length data. In FIG. 7, a route along which a data is transferred in units of a word length is indicated with a thick line while a route along which a data is transferred in units of a sub-word length.

The operations of the SHIFT·CLIP unit 16 and Y register 17 will be described in further detail below with reference to FIGS. 8 to 10:

First, it is assumed that a word-long data is stored in a cycle 1 in the P register 15. For example, it is assumed that the P register 15 has a data having a word length of 64 bits stored in the cycle 1 of $P_1 0, P_1 1, P_1 2, P_1 3, P_1 4, P_1 5, P_1 6$ and $P_1 7$ each of 8 bits, counted from the LSB as shown in FIG. 8A. The data stored n the P register 15 is not divided in sub-words (note that as shown in FIGS. 8 to 10, the data content of the P register 15 are divided in sub-words). Then the SHIFT·CLIP unit 16 reads a word-long data from the P register 15 and shifts it by a predetermined number of bits. For example, the SHIFT·CLIP unit 16 shifts the data by zero bit to the right as shown in FIG. 8B. With this shift by zero bit to the right (namely, the data is not shifted at all), the data will be a 64-bit data composed of $P_1 0, P_1 1, P_1 2, P_1 3, P_1 4, P_1 5, P_1 6$ and $P_1 7$ each of 8 bits, counted from the LSB. The SHIFT·CLIP unit 16 clips the data to an 8-bit length as shown in FIG. 8C. With this clipping, the data at higher bits than the eighth bit are clipped, so that only an 8-bit data at $P_1 0$ will remain. Next, the SHIFT·CLIP unit 16 stores the clipped data of an arbitrary bit length into the Y register 17. For example, the SHIFT·CLIP unit 16 will stores an 8-bit data at $P_1 0$ into the Y register 17. Since the Y register 17 is designed to work as a shift register, it will store the received data one after another, starting with a one at MSB, and shifts existent data therein to the lower bits correspondingly. For example, the Y register 17 will store an 8-bit data at $P_1 0$ at MSB as shown n FIG. 8D.

The status that the 8-bit data at P10 is stored at MSB of the Y register 17 will be followed by a cycle 2 as will be described below:

As shown in FIG. 9A, the P register 15 has stored therein a 64-bit word in a cycle 2 of $P_2 0$, $P_2 1$, $P_2 2$, $P_2 3$, $P_2 4$, $P_2 5$, $P_2 6$ and $P_2 7$ each of 8 bits counted from the LSB, as in the above. Next, the SHIFT·CLIP unit 16 will shift the data by 8 bits, for example, to the right as shown in FIG. 9B. With this data shift by 8 bits to the right, the data will be a 64-bit one consisting of $P_2 1$, $P_2 2$, $P_2 3$, $P_2 4$, $P_2 5$, $P_2 6$, $P_2 7$ and * at every 8 bits counted from the LSB as shown in FIG. 9B. Note that "*" indicates a sign of a data at $P_2 7$ (0x00 when positive, and 0xFF when negative). Then, the SHIFT·CLIP unit 16 clips the data to a length of 8 bits as shown in FIG. 9C. With this clipping, there will remain only an 8-bit data at $P_2 1$. Further, the SHIFT·CLIP unit 16 stores the 8-bit data at $P_2 1$ into the Y register 17. In the Y register 17, there will be stored the 8-bit data at $P_2 1$ at MSB for example, and an existing 8-bit data at $P_1 0$ be shifted by 8 bits to the right, as shown in FIG. 9D.

Also, an 8-bit data at $P_2 1$ is stored at MSB of the Y register 17, and the status that the 8-bit data at $P_1 0$ is stored at MSB of the Y register 17 will be followed by a cycle 3 as will be described below:

In the P register 15, there is stored a 64-bit data in the cycle 3 of $P_3 0$, $P_3 1$, $P_3 3$, $P_3 4$, $P_3 5$, $P_3 6$ and $P_3 7$ each of 8 bits counted from the LSB, as in the above. Next, the SHIFT·CLIP unit 16 will shift the data by 56 bits, for example, to the right as shown in FIG. 10A. With this data shift by 56 bits to the right, the data will be a 64-bit one consisting of $P_3 7$, *, *, *, *, *, * and * ("*" is a sign of a data at $P_3 7$) at every 8 bits counted from the LSB as shown in FIG. 10B. Then, the SHIFT·CLIP unit 16 will clip the data to a length of 8 bits as shown in FIG. 10C. With this clipping, there will remain only the 8-bit data at $P_3 7$. Further, the SHIFT·CLIP unit 16 will store the 8-bit data at $P_3 7$ into the Y register 17. In the Y register 17, there will be stored the 8-bit data at $P_3 7$ at MSB of the Y register 17 and existing 8-bit data at $P_2 1$ and $P_1 0$ be shifted by 8 bits to the right, as shown in FIG. 10D.

As in the above, the SHIFT·CLIP unit 16 makes the above operations to shift and clip the word-long output data and store the data thus shifted and clipped in units of a sub-word length into the Y register 17. By repeating the shifting and clipping the data in units of 8 bits, a plurality of sub-words each having 8 bits can be produced. Note that the number of bits for shifting and bit length for clipping are controlled by the control circuit 8. By the control of the shifting amount and bet length, any other arbitrary number of bits into which a word-long data is divided, than the 8 bits can be selected.

Also, the division of a word-long data into sub-words by the SHIFT·CLIP unit 16 may not only be applied to the output data from the INPROD unit 3, but to a data from the register file 2 since there is provided a data transfer bus from the register file 2 to the P register 15. Of course, by providing data buses from the ALU 4 and other arithmetic circuits such as MAC (not shown) to the P register 15, each of word-long data output from the ALU 4 and other arithmetic circuits can be divided into sub-words.

Examples of execution instructions used in the information processor 1 constructed as having been described in the foregoing, and operations effected in the components of the information processor on the instructions, will be described below:

As previously described, the information processor 1 includes the control circuit 8 capable of a five-step pipeline processing consisting of an instruction fetch (IF) step, register fetch (RF) step, first execution stage ($Ex_A$) step, second execution stage ($Ex_B$) step and a write-to-buffer (WB) step, as shown in FIG. 11. The control circuit 8 will provide control signals based on instructions stored in the instruction memory 7 to various circuits, respectively, of the information processor.

More particularly, the following five sets of instructions are typically used in the information processor 1:

SET. C used only for loading a coefficient data to the C register 11

SET. CR for loading a coefficient data to the C register 11 and initializing the Y register 17 to zero INPROD for making an inner-product operation and shifting INPROD. L for loading a source data to the XH and XL registers 12 and 13 and making an inner-product operation INPROD. S for shifting data in the XH and XL registers 12 and 13 by one sub-word to the right, and making an inner-product operation The SET. C is an instruction for a processing as shown in FIG. 12. Namely, in the SET. C instruction, an instruction is fetched and decoded (IF). Next, a coefficient data is loaded from the register file 12 to the C register 11 (RF). Note that on the SET. C instruction, the operations $Ex_A$, $Ex_B$ and WB will not be effected (NOP). The SET. C instruction is used to process end points of an image for example. On this instruction, the Y register 17 as an output register is not initialized but the image processing is done with only the coefficient data replaced.

The SET. CR is an instruction for a processing as shown in FIG. 13. That is, on the SET. CR instruction, an instruction is fetched and decoded (IF). Then, a coefficient data is loaded from the register file 2 to the C register 11 (RF). Next, zeros are stored into the Y register 17 to initialize the latter ($Ex_A$). Note that on this SET. CR instruction, the $Ex_B$ and WB operations will not be done (NOP). In effect, this SET. CR instruction is an initial instruction for an inner-product operation of an image and sound.

The INPROD is an instruction for a processing as shown in FIG. 14. Namely, on this INPROD instruction, an instruction is fetched and decoded (IF). Then, a source data is loaded from the register file 2 to the XL register 13 (RF). Next, the INPROD unit 3 will make an inner-product operation, in units of a sub-word, of the source data stored in the XL register 13 and the coefficient data stored in the C register 11, that is, an SIMD type inner-product operation of these data, and store the result of the inner-product operation into the P register 15 ($Ex_A$). Then, the SHIFT·CLIP unit 16 shifts the data on the word-long inner-product result stored in the P register 15 by a number of bits corresponding to a control instruction from the control circuit 8, clips the shifted data to a number of bits corresponding to a control instruction from the control circuit 8, and writes the clipping result as kept in the word length into the Y register 17 ($Ex_B$). Further, the SHIFT·CLIP unit 16 will write the data stored in the Y register 17 into the register file 2 (WB). In effect, on this INPROD instruction, the result of inner-production operation is written as kept in the word length into the Y register 17.

The INPROD. L is an instruction for a processing as shown in FIG. 15. That is, on the INPROD. L instruction, an instruction is fetched and decoded (IF). Next, two source data are loaded from the register file 2 into the XH and XL registers 12 and 13, respectively (RF). Then, the INPROD unit 3 makes an inner-production operation, in units of a sub-word, of the source data stored in the XL register 13 and coefficient data stored in the C register 11, namely, an SIMD type inner-product operation of the data, and stores the result of the inner-product operation into the P register 15 ($Ex_A$). Then, the SHIFT·CLIP unit 16 shifts the word-long result of the inner-product operation, stored in the P register 15, by a number of bits corresponding to an instruction from the control circuit 8, clips the result of the shifting to a number of bits corresponding to an instruction from the control circuit 8, and writes the result of the clipping at the MSB of the Y register 17 as a sub-word. At this time, in the Y register 17, the existing data is shifted sub-word by sub-word to the right ($Ex_B$). Next, the SHIFT·CLIP unit 16 writes the data stored in the Y register 17 into the register file 2 (WB). In effect, on the INPROD. L instruction, the source data is loaded and the result of the inner-product operation is written into the Y register 17 in units of a sub-word.

The INPROD. S is an instruction for a processing as shown in FIG. 16. That is, on the INPROD. S instruction, an instruction is fetched and decoded (IF). Next, two source data stored in the XH and XL registers 12 and 13, respectively are shifted sub-word by sub-word to the right. At this time, a zero (0) is stored at the MSB of the XH register 12 while a sub-word at the LSB of the XH register 12 is shifted to the MSB of the XL register 13 (RF). Then, the INPROD unit 3 makes an inner-production operation, in units of a sub-word, of the source data stored in the XL register 13 and coefficient data stored in the C register 11, namely, an SIMD type inner-product operation of the data, and stores the result of the inner-product operation into the P register 15 ($Ex_A$). Then, the SHIFT·CLIP unit 16 shifts the word-long result of the inner-product operation, stored in the P register 15, by a number of bits corresponding to an instruction from the control circuit 8, clips the result of the shifting to a number of bits corresponding to an instruction from the control circuit 8, and writes the result of the clipping at the MSB of the Y register 17 as a sub-word. At this time, in the Y register 17, the existing data is shifted sub-word by sub-word ($Ex_B$) to the right. Next, the SHIFT·CLIP unit 16 writes the data from the Y register 17 into the register file 2 (WB). In effect, on the INPROD. S instruction, the source data is shifted and the result of the inner-product operation is written into the Y register 17 in units of a sub-word. The INPROD. S instruction is used to repeatedly make an inner-product operation of the source data having been loaded in the XH and XL registers 12 and 13.

Note that a data size by which a data stored in the P register 15 is shifted and a data size to which the shifted data is clipped, namely, a data size in which the data is written into the Y register 17 as a sub-word, can arbitrarily be set by the control circuit 8 irrespectively of the size of each of sub-words of a source data stored in each register.

Assume that a coefficient data and source data are stored in the C register 11, and XH and XL registers 12 and 13 each as an 8-bit sub-word and the result of an inner-product operation is stored into the P register 15 as a 64-bit word.

In this case, to provide a data unit of 8 bits as a sub-word, the data stored in the P register 15 is shifted and then clipped to extract data at the lower 8 bits. Then the data stored in the Y register 17 is shifted by 8 bits to the right and clipped to a length of 8 bits. This 8-bit data is stored as a sub-word at the MSB.

To provide a data unit of 16 bits as a sub-word, the data stored in the P register 15 is shifted and clipped to extract data at the lower 16 bits. Then the data stored in the Y register 17 is shifted by 16 bits to the right and clipped to a length of 16 bits. This 16-bit data is stored as a sub-word at the MSB.

Also, to provide a data unit of 32 bits as a sub-word, the data stored in the P register 15 is shifted and clipped to extract data at the lower 32 bits. Then the data stored in the Y register 17 is shifted by 32 bits to the right and clipped to a length of 32 bits. The 32-bit data is stored as a sub-word at the MSB.

Figure 17:
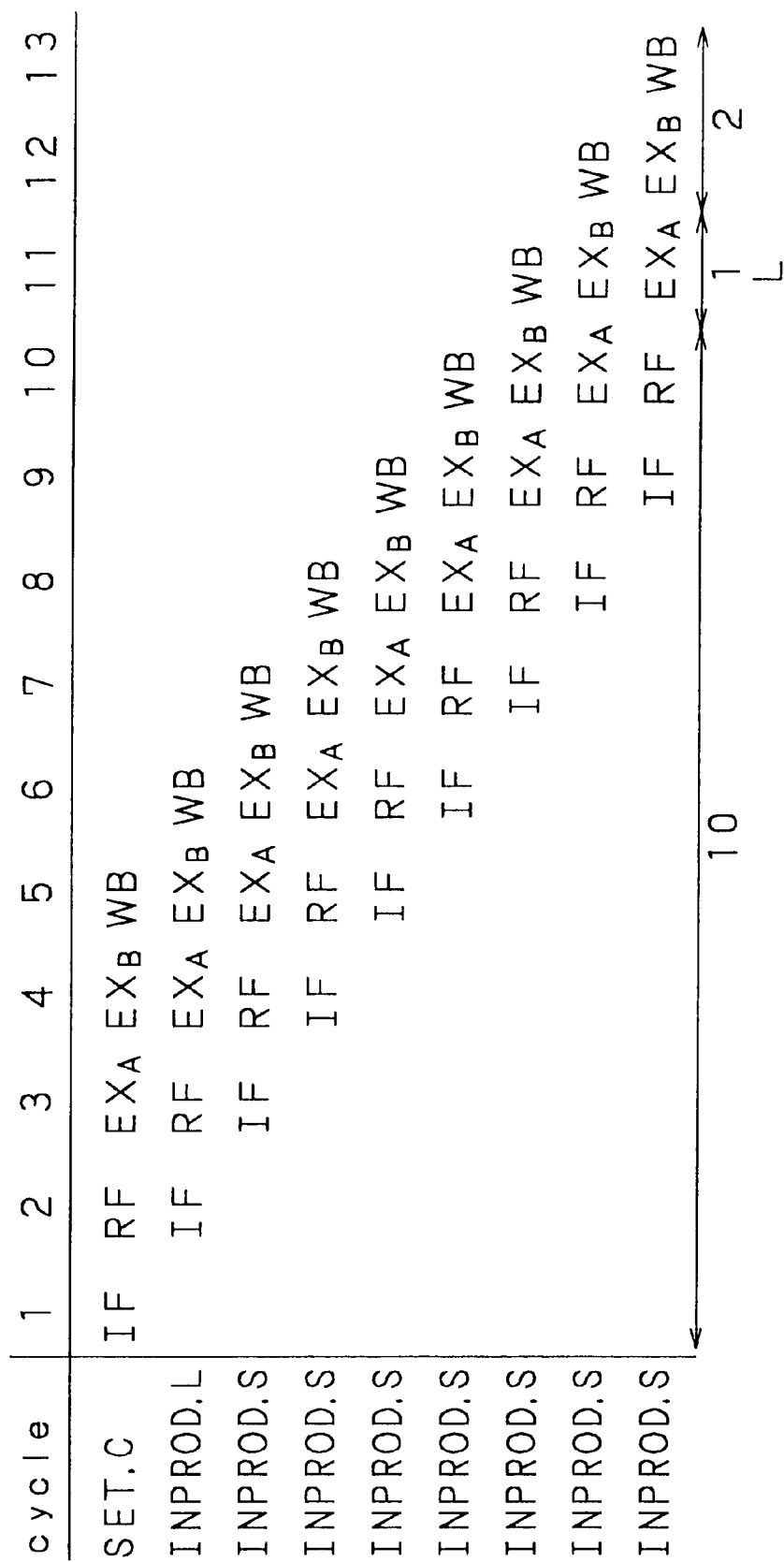
FIG. 17 shows a program sequence in which the inner-product operation is done eight times in the information processor.

Next, there will be described an example of the sequence of operations of the information processor 1 in which eight inner-product operations are repeated using the above-mentioned instructions:

FIG. 17 shows a program sequence and operations in each cycle when the inner-production operation is repeatedly done eight times. FIGS. 18 to 26 show the stored states of data in the XH and XL registers 12 and 13 and Y register 17 during execution of each instruction set on the assumption that the data size of one sub-word is 8 bits.

Figure 18:
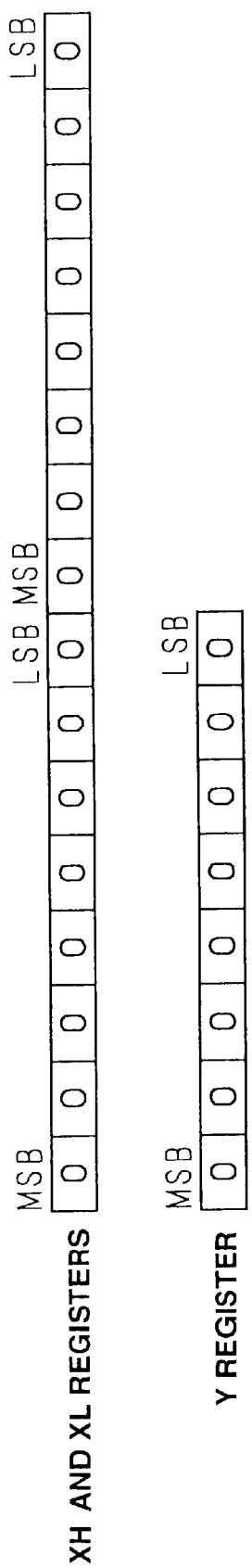
FIG. 18 explains a data stored into the higher and lower input registers and output register of the information processor on the instruction executed starting at the first cycle in the program sequence in FIG. 17.

First, execution of the SET. C instruction is started at the first cycle. On the SET. C instruction, a coefficient data is stored into the C register 11. At this time, it is assumed that the XH and XL registers 12 and 13 have stored therein the data used in the preceding operation or zeros as shown in FIG. 18. Also it is assumed that zeros are stored at all the bits in the Y register 17. The execution of the SET. C instruction, having been started as the first cycle, is completed at the fifth cycle.

Figure 19:
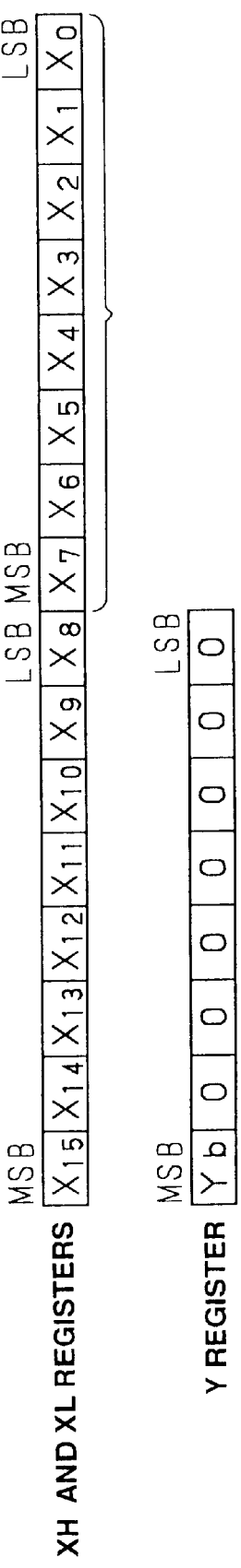
FIG. 19 explains a data stored into the higher and lower input registers and output register of the information processor on the instruction executed starting at the second cycle in the program sequence in FIG. 17.

Then, the INPROD. L instruction starts being executed at the second cycle. On the INPROD. L instruction, a source data is stored into the XH and XL registers 12 and 13, and the result of inner-product operation based on the source data and stored in the XL register 13 is stored into the Y register 17. At this time, data at X0 to X15 each of 8 bits are stored into the XH and XL registers 12 and 13 in a direction from the LSB of the XL register 13 toward the MSB of the XH register 12, as shown in FIG. 19. Also, a data Yb being a result of the inner-product operation made using the data at X0 to X7, stored in the XL register 13 is stored at the MSB of the Y register 17, and the existing data in the Y register 17 are shifted by 8 bits to the right. The execution of the INPROD. L instruction, having been started at the second cycle, is completed at the sixth cycle.

Figure 20:
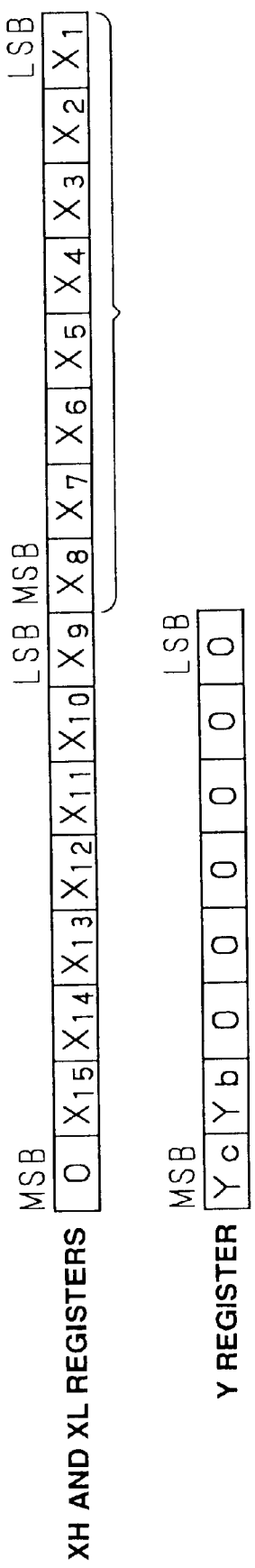
FIG. 20 explains a data stored into the higher and lower input registers and output register of the information processor on the instruction executed starting at the third cycle in the program sequence in FIG. 17.

Next, the INPROD. S instruction starts being executed at the third cycle. On the INPROD. S instruction, the source data stored in the XH and XL registers 12 and 13 are shifted by one sub-word to the right, and the result of an inner-product operation based on the source data stored in the XL register 13 is stored into the Y register 17. At this time, the XH and XL registers 12 and 13 store data at X1 to X15 each of 8 bits in the direction from the LSB of the XL register 13 toward MSB of the XH register 12 and zeros at 8 bits counted from the LSB of the XL register 13, as shown in FIG. 20. Also, in the Y register 17, a data Yc being the result of an inner-product operation effected using data at X1 to X8 stored in the XL register 13 is stored at the MSB, and the existing data are shifted by 8 bits to the right. The execution of the INPROD. S instruction, having been started at the third cycle is completed at the seventh cycle.

Figure 21:
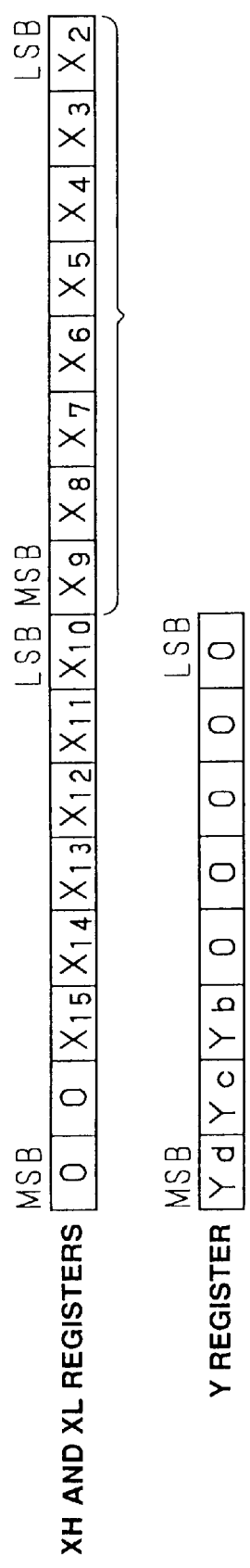
FIG. 21 explains a data stored into the higher and lower input registers and output register of the information processor on the instruction executed starting at the fourth cycle in the program sequence in FIG. 17.

Then, the INPROD. S instruction is executed starting at the fourth cycle. The XH and XL registers 12 and 13 store data at X2 to X15 each of 8 bits in a direction from the LSB of the XL register 13 toward the MSB of the XH register 12 and zeros at 16 bits counted from the MSB of the XH register 12 as shown in FIG. 21. Also, the Y register 17 stores at the MSB a data Yd being the result of an inner-product operation effected using data at X2 to X9, stored in the XL register 13, and the existing data are shifted by 8 bits to the right. Execution of the INPROD. S instruction, having been started at the fourth cycle, is completed at the eighth cycle.

Figure 22:
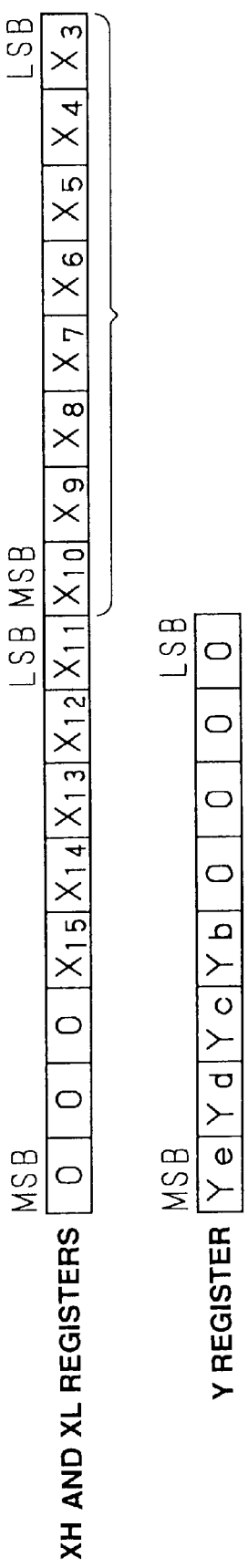
FIG. 22 explains a data stored into the higher and lower input registers and output register of the information processor on the instruction executed starting at the fifth cycle in the program sequence in FIG. 17.

Then, the INPROD. S instruction is executed starting at the fifth cycle. The XH and XL registers 12 and 13 store data at X3 to X15 each of 8 bits in a direction from the LSB of the XL register 13 toward the MSB of the XH register 12 and zeros at 24 bits counted from the MSB of the XH register 12 as shown in FIG. 22. Also, the Y register 17 stores at the MSB a data Ye being the result of an inner-product operation effected using data at X3 to X10, stored in the XL register 13, and the existing data are shifted by 8 bits to the right. Execution of the INPROD. S instruction, having been started at the fifth cycle, is completed at the ninth cycle.

Figure 23:
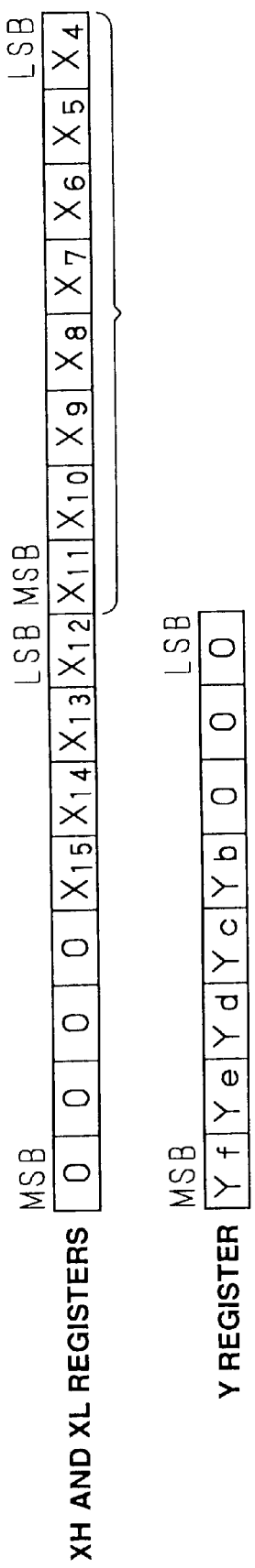
FIG. 23 explains a data stored into the higher and lower input registers and output register of the information processor on the instruction executed starting at the sixth cycle in the program sequence in FIG. 17.

Then, the INPROD. S instruction is executed starting at the sixth cycle. The XH and XL registers 12 and 13 store data at X4 to X15 each of 8 bits in a direction from the LSB of the XL register 13 toward the MSB of the XH register 12 and zeros at 32 bits counted from the MSB of the XH register 12 as shown in FIG. 23. Also, the Y register 17 stores at the MSB a data Yf being the result of an inner-product operation effected using data at X4 to X11, stored in the XL register 13, and the existing data are shifted by 8 bits to the right. Execution of the INPROD. S instruction, having been started at the sixth cycle, is completed at the tenth cycle.

Figure 24:
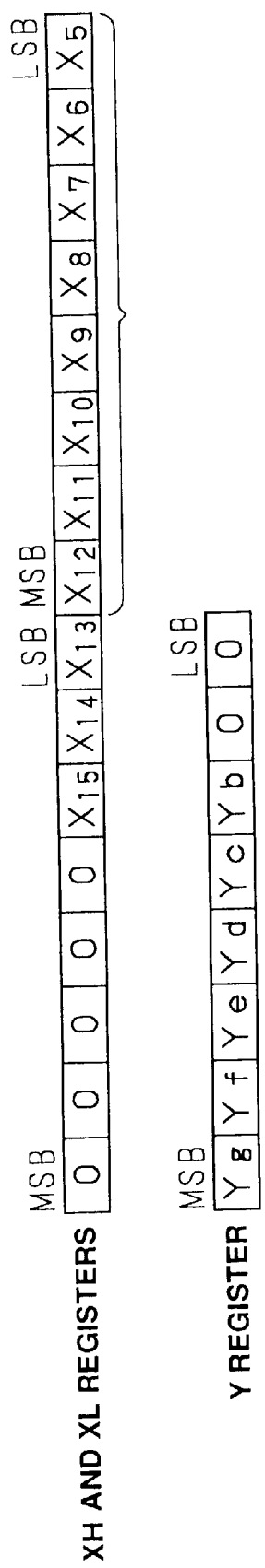
FIG. 24 explains a data stored into the higher and lower input registers and output register of the information processor on the instruction executed starting at the seventh cycle in the program sequence in FIG. 17.

Then, the INPROD. S instruction is executed starting at the seventh cycle. The XH and XL registers 12 and 13 store data at X5 to X15 each of 8 bits in a direction from the LSB of the XL register 13 toward the MSB of the XH register 12 and zeros at 40 bits counted from the MSB of the XH register 12 as shown in FIG. 24. Also, the Y register 17 stores at the MSB a data Yg being the result of an inner-product operation effected using data at X5 to X12, stored in the XL register 13, and the existing data are shifted by 8 bits to the right. Execution of the INPROD. S instruction, having been started at the seventh cycle, is completed at the eleventh cycle.

Then, the INPROD. S instruction is executed starting at the eighth cycle.

Figure 25:
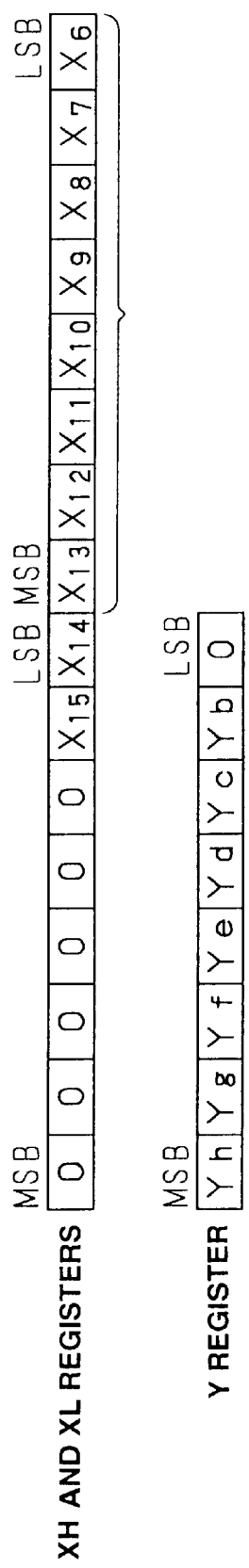
FIG. 25 explains a data stored into the higher and lower input registers and output register of the information processor on the instruction executed starting at the eighth cycle in the program sequence in FIG. 17.

The XH and XL registers 12 and 13 store data at X6 to X15 each of 8 bits in a direction from the LSB of the XL register 13 toward the MSB of the XH register 12 and zeros at 48 bits counted from the MSB of the XH register 12 as shown in FIG. 25. Also, the Y register 17 stores at the MSB a data Yh being the result of an inner-product operation effected using data at X6 to X13, stored in the XL register 13, and the existing data are shifted by 8 bits to the right. Execution of the INPROD. S instruction, having been started at the eighth cycle, is completed at the twelfth cycle.

Figure 26:
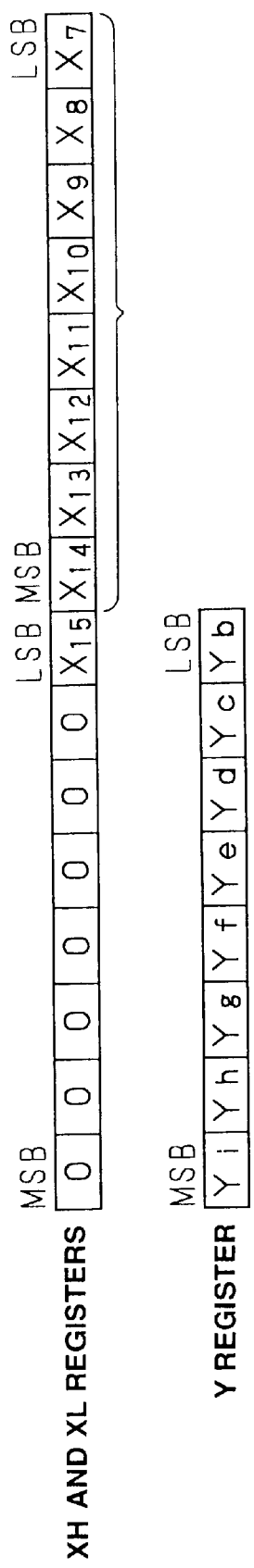
FIG. 26 explains a data stored into the higher and lower input registers and output register of the information processor on the instruction executed starting at the ninth cycle in the program sequence in FIG. 17.

Then, the INPROD. S instruction is executed starting at the ninth cycle. The XH and XL registers 12 and 13 store data at X7 to X15 each of 8 bits in a direction from the LSB of the XL register 13 toward the MSB of the XH register 12 and zeros at 56 bits counted from the MSB of the XH register 12 as shown in FIG. 26. Also, the Y register 17 stores at the MSB a data Yi being the result of an inner-product operation effected using data at X7 to X14, stored in the XL register 13, and the existing data are shifted by 8 bits to the right. Execution of the INPROD. S instruction, having been started at the ninth cycle, is completed at the thirteenth cycle.

As in the above, the inner-product operation can be repeated eight times by executing each instruction. Using the instructions, the information processor 1 can ideally complete the eight inner-product operations in the 13 cycles.

The sequence example having been described in the above is based on an assumption that the operation at each of the stages IF, RF, $Ex_A$, $Ex_B$ and WB is completed within one cycle. Since the operation at the stage $Ex_A$ is larger than at the other stages, however, it will not be completed within one cycle as the case may be. In this case, if the operation at the stage $Ex_A$ takes L cycles, the time for the operation at the stage $Ex_A$, effected in the eleventh cycle adds to the sequence and thus the number of cycles is a total of 12+L cycles.

As having been described in the foregoing, in the information processor 1 according to the present invention, a word-long result of an inner-product operation, provided from the INPROD unit 3 is shifted and clipped by the SHIFT·CLIP unit 16 and the result of the clipping is stored as a sub-word into the Y register 17. Thus, after the inner-product operation, the data divided in sub-words can be stored directly into the register file 2. Therefore, in the information processor 1, the data has not to be converted back to the form of sub-words after stored in the register file 2, which permits to omit the register file 2 and reduce the number of execution cycles.

The information processor 1 according to the present invention may be modified as will be described below. The variants of the information processor 1 will be described with reference to FIG. 3. In FIGS. 27 to 35, the same or similar components as or to those in the variants are indicated with the same or similar references as in FIG. 3 and will not be described any further.

Figure 27:
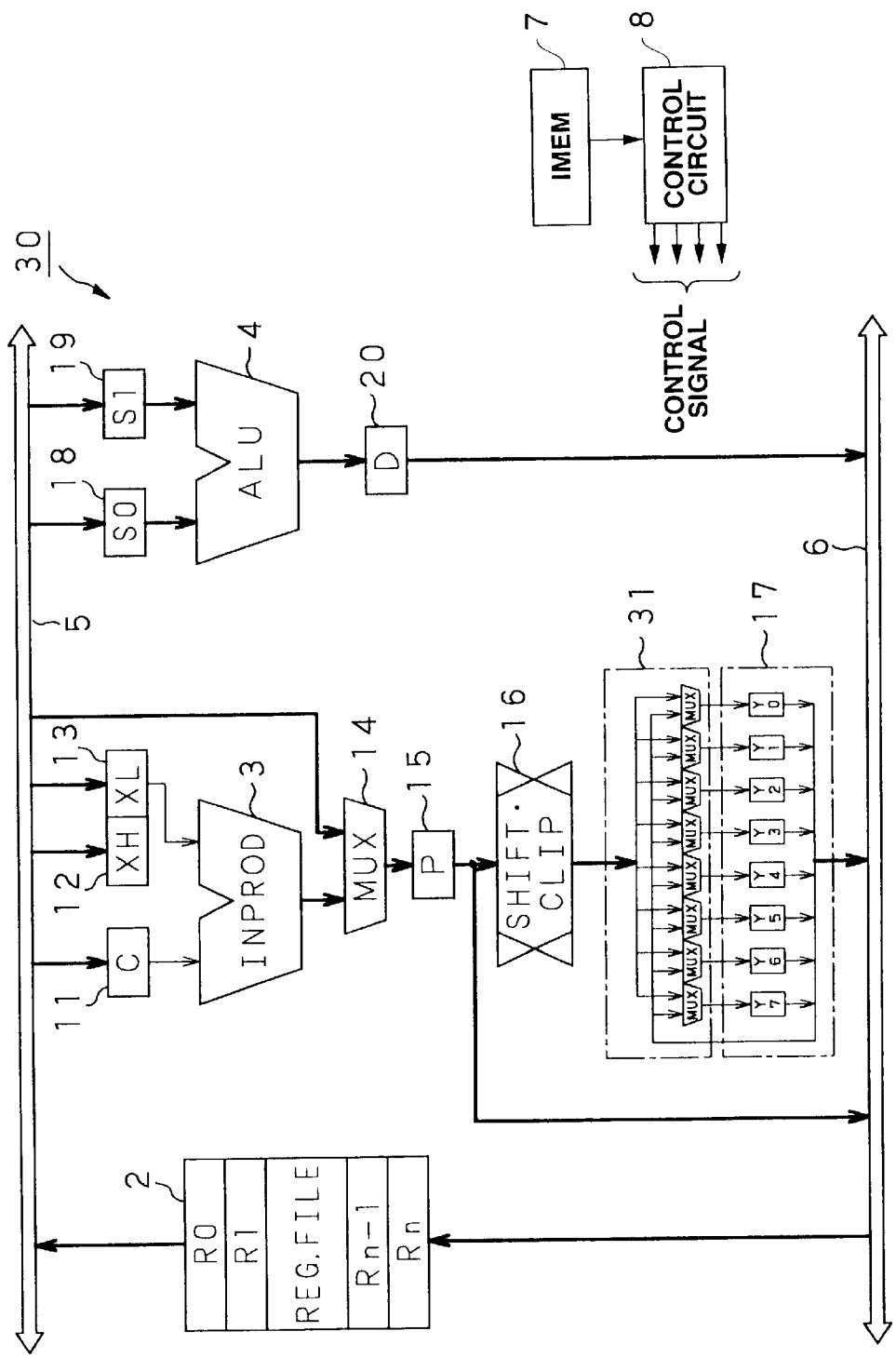
FIG. 27 is a block diagram of a first variant of the information processor according to the present invention.

FIG. 27 shows a first variant of the information processor. The information processor is generally indicated with a reference 30. As shown, the information processor 30 has provided therein a multiplexer 31 between the SHIFT·CLIP unit 16 and Y register 17. The multiplexer 31 stores a data divided in sub-units, provided from the SHIFT·CLIP unit 16 at an arbitrary position in the Y register 17. As seen from FIG. 27, the multiplexer 31 is composed of eight sub-multiplexers each storing a sub-word-long data. Each of the sub-multiplexers is supplied with a sub-word-long data transferred from a sub-register (Y0 to Y7) of the Y register 17, and a sub-word-long data processed by the SHIFT·CLIP unit 16 and stores these data in the sub-registers of the Y register 17. Note that data paths from each of the sub-registers Y0 to Y7 of the Y register 17 are connected to all the sub-multiplexers (only one of the data paths of each sub-register is shown in FIG. 27 for the simplicity of illustration). Therefore, a sub-word-long data once stored in the Y register 17 can be written back at an arbitrary position in the Y register 17. Thus, the information processor 30 can effect the same operations as the information processor 1 and store a sub-word-long data at an arbitrary position in the Y register 17 not in the sequence of operations in the INPROD unit 3, thereby permitting to easily rearrange the result of operation.

Figure 28:
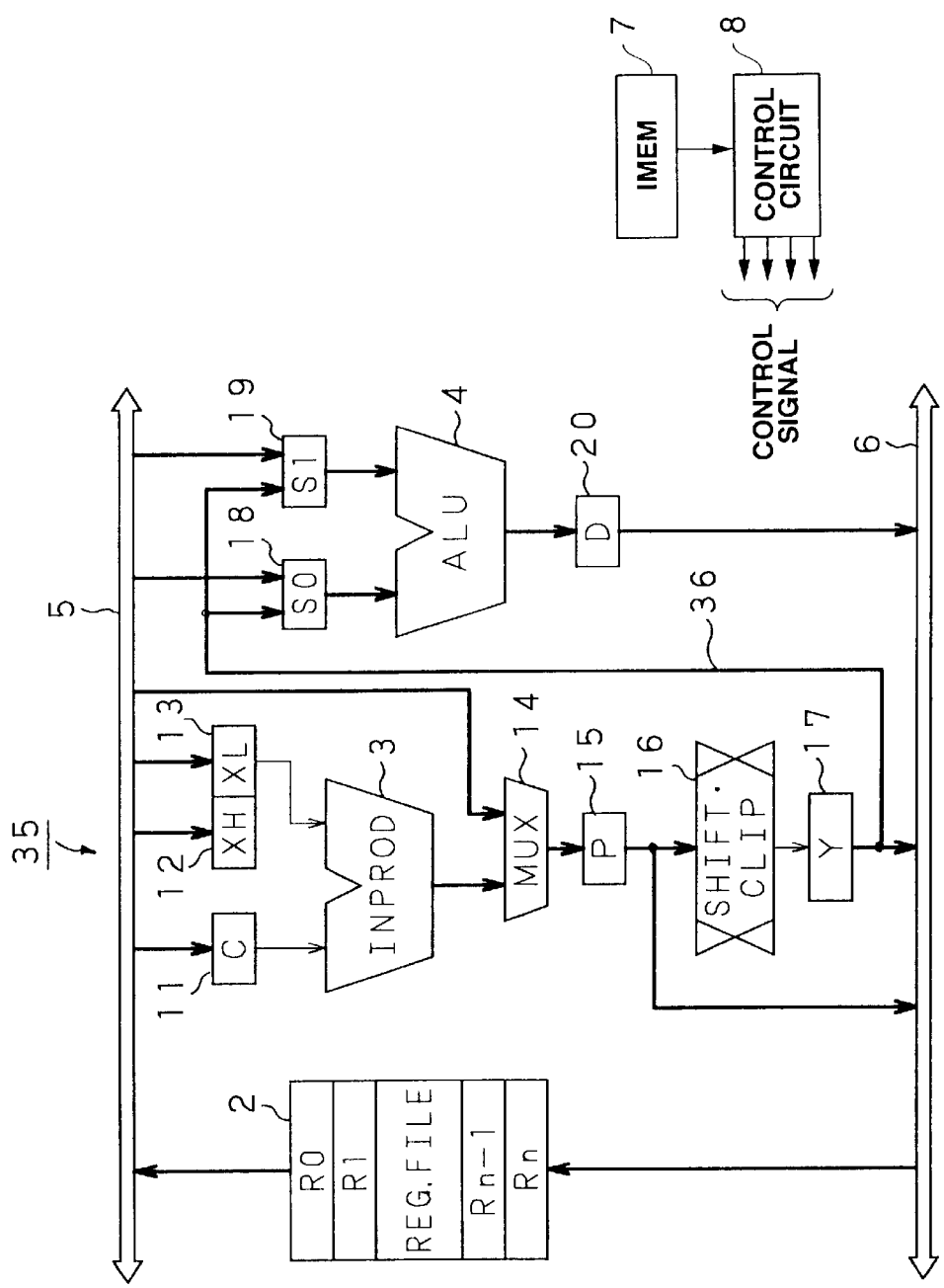
FIG. 28 is a block diagram of a second variant of the information processor according to the present invention.

Then, a second variant of the information processor 1 will be described with reference to FIG. 28. This information processor is generally indicated with a reference 35. The information processor 35 has provided therein a data transfer path 36 from the Y register 17 to the S0 and S1 registers 18 and 19. In this information processor 35, the data transfer path 36 transfers data from the Y register 17 to the S0 or S1 register 18 or 19, not via the register file 2. Therefore, the information processor 35 can continuously compute subword-long or data-long results of operations stored in the Y register 17 by the ALU 4, thereby permitting to operate in the same manner as the information processor 1 within a reduced number of cycles.

Figure 29:
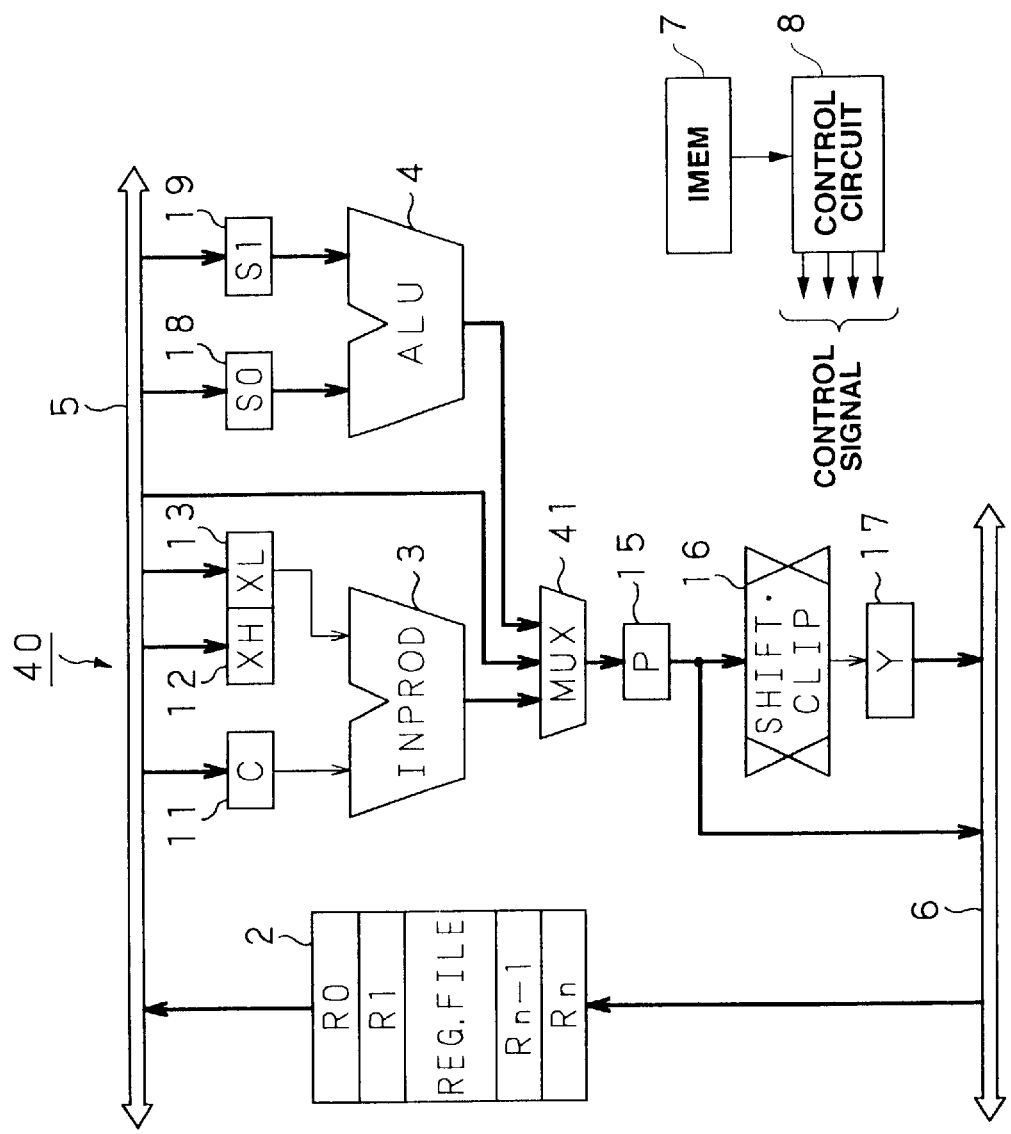
FIG. 29 is a block diagram of a third variant of the information processor according to the present invention.

A third variant of the information processor 1 is shown in FIG. 29. This information processor is generally indicated with a reference 40. As shown, the information processor 40 has provided therein a multiplexer 41 in place of the multiplexer 14 provided in the information processor 1. The multiplexer 41 selects an output data from the INPROD unit 3, a data transferred via the first data transfer bus 5 or an output data from the ALU 4. Also, the information processor 40 has not provided therein the D register 20 provided in the information processor 1, as shown. In the information processor 40, the result of operation effected in the ALU 4 is stored into the P register 15, so that it can be processed with the operation with which the result of operation effected in the INPROD unit 3 is provided to be a sub-word-long data. Thus, the information processor 40 can convert the result of operation from the INPROD unit 3 as well as all the word-long results of operation directly to a sub-word-long data and store them into the register file 2.

Figure 30:
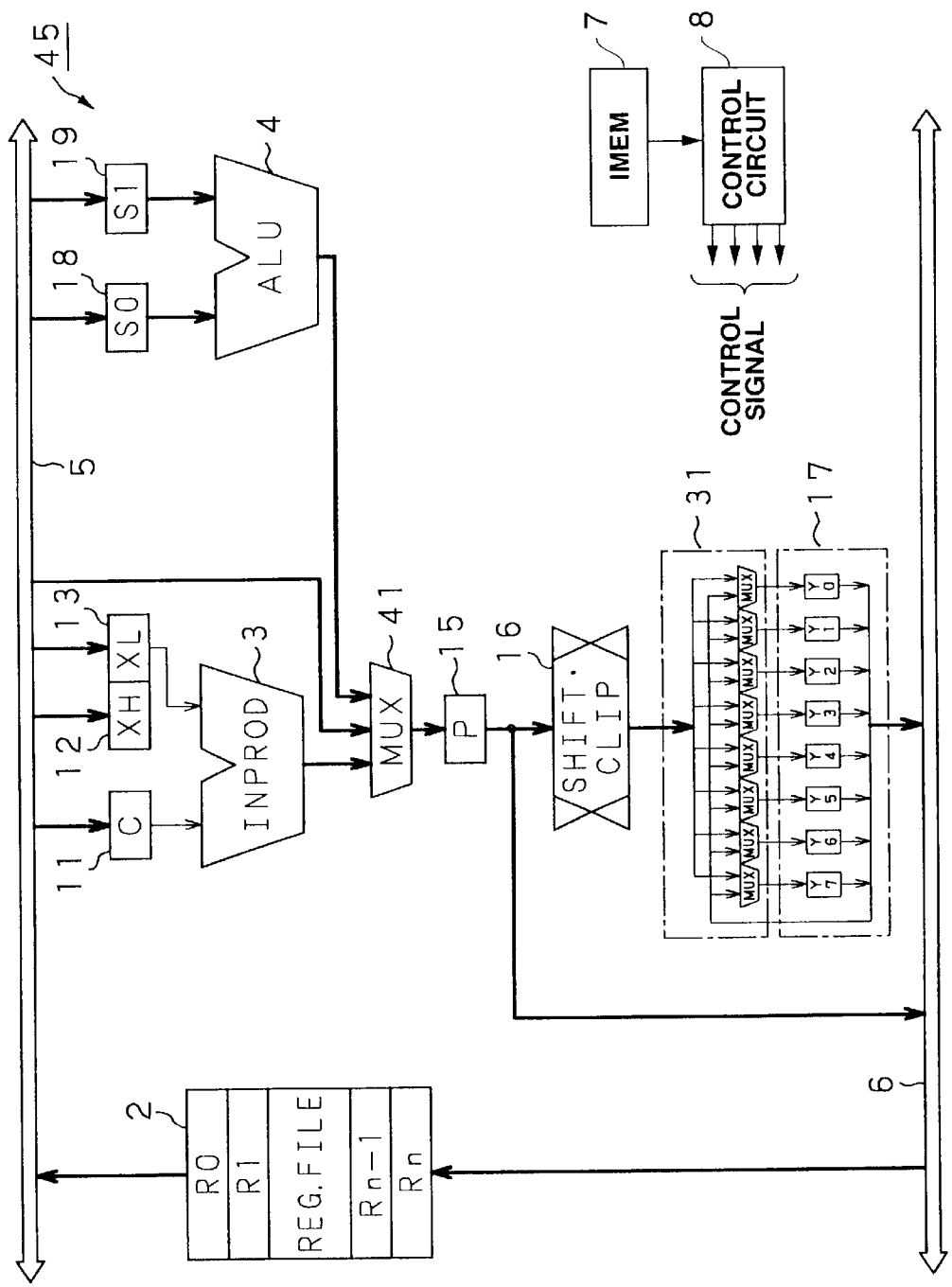
FIG. 30 is a block diagram of a fourth variant of the information processor according to the present invention.

A fourth variant of the information processor 1 is shown in FIG. 30. This information processor is generally indicated with a reference 45. The information processor 45 has a multiplexer 41 provided therein in place of the multiplexer 14 provided in the information processor 1 and which selects an output data from the INPROD unit 3, a data transferred via the first data transfer bus 5 or an output data from the ALU 4, and a multiplexer 31 provided between the SHIFT·CLIP unit 16 and Y register 17. Namely, the information processor 45 is a version of the third information processor 40 (third variant) provided with the multiplexer 31 provided in the information processor 30 (first variant). Thus, the information processor 45 can convert the result of operation from the INPROD unit 3 as well as all the word-long results of operation directly to a sub-word-long data for storage into the register file 2, and store a sub-word-long data at an arbitrary position in the Y register 17, thereby permitting to easily rearrange the results of operations.

Figure 31:
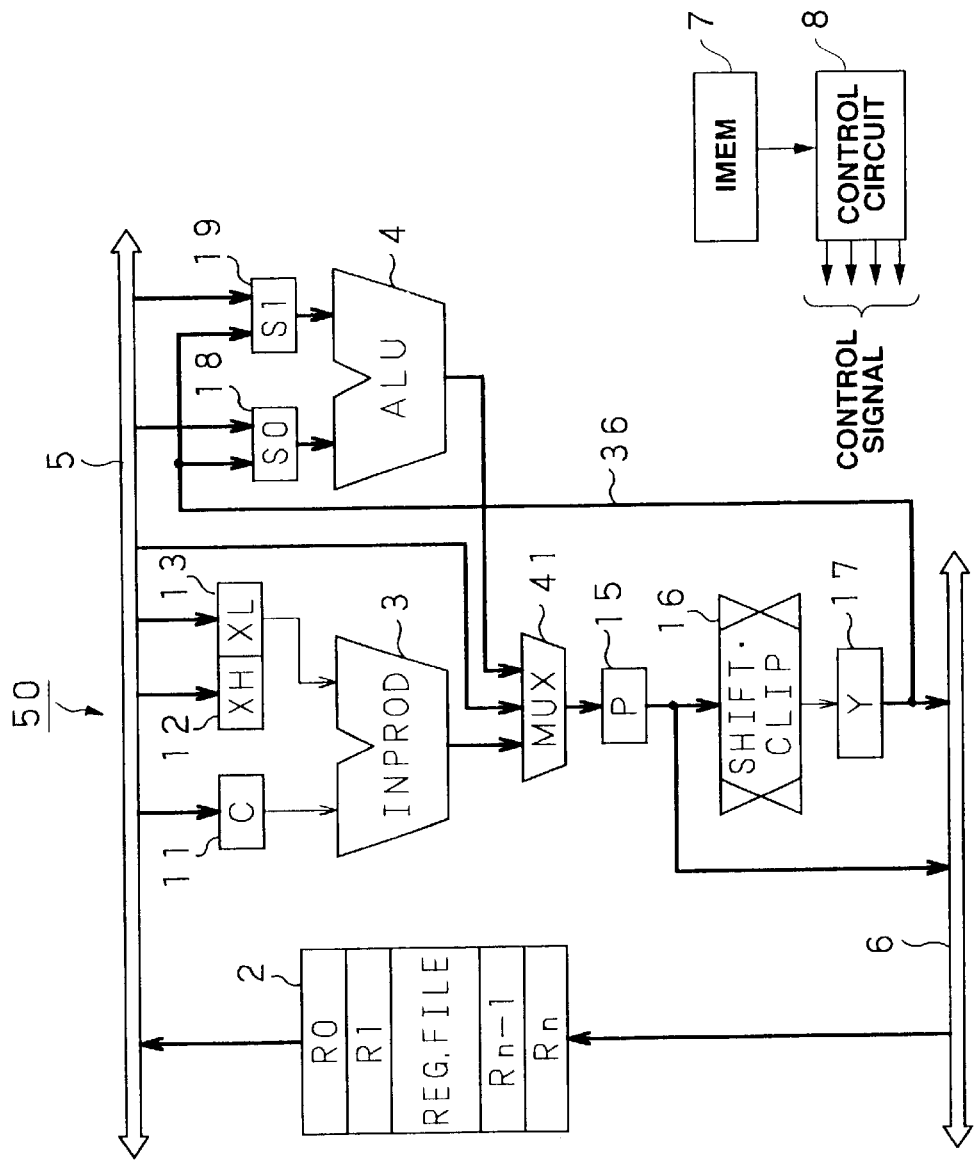
FIG. 31 is a block diagram of a fifth variant of the information processor according to the present invention.

A fifth variant of the information processor 1 is shown in FIG. 31. This information processor is generally indicated with a reference 50. The information processor 50 has a multiplexer 41 provided therein in place of the multiplexer 14 provided in the information processor 1 and which selects an output data from the INPROD unit 3, a data transferred via the first data transfer bus 5 or an output data from the ALU 4, and a data transfer path 36 from the Y register 17 to the S0 and S1 registers 18 and 19. Namely, the information processor 50 is a version of the third information processor 40 (third variant) provided with the data transfer path 36 provided in the information processor 35 (second variant). Thus, the information processor 50 can convert the result of operation from the INPROD unit 3 as well as all the word-long results of operation directly to a sub-word-long data for storage into the register file 2, and continuously compute a sub-word-long or word-long results of operation stored in the Y register 17 within a reduced number of cycles.

Figure 32:
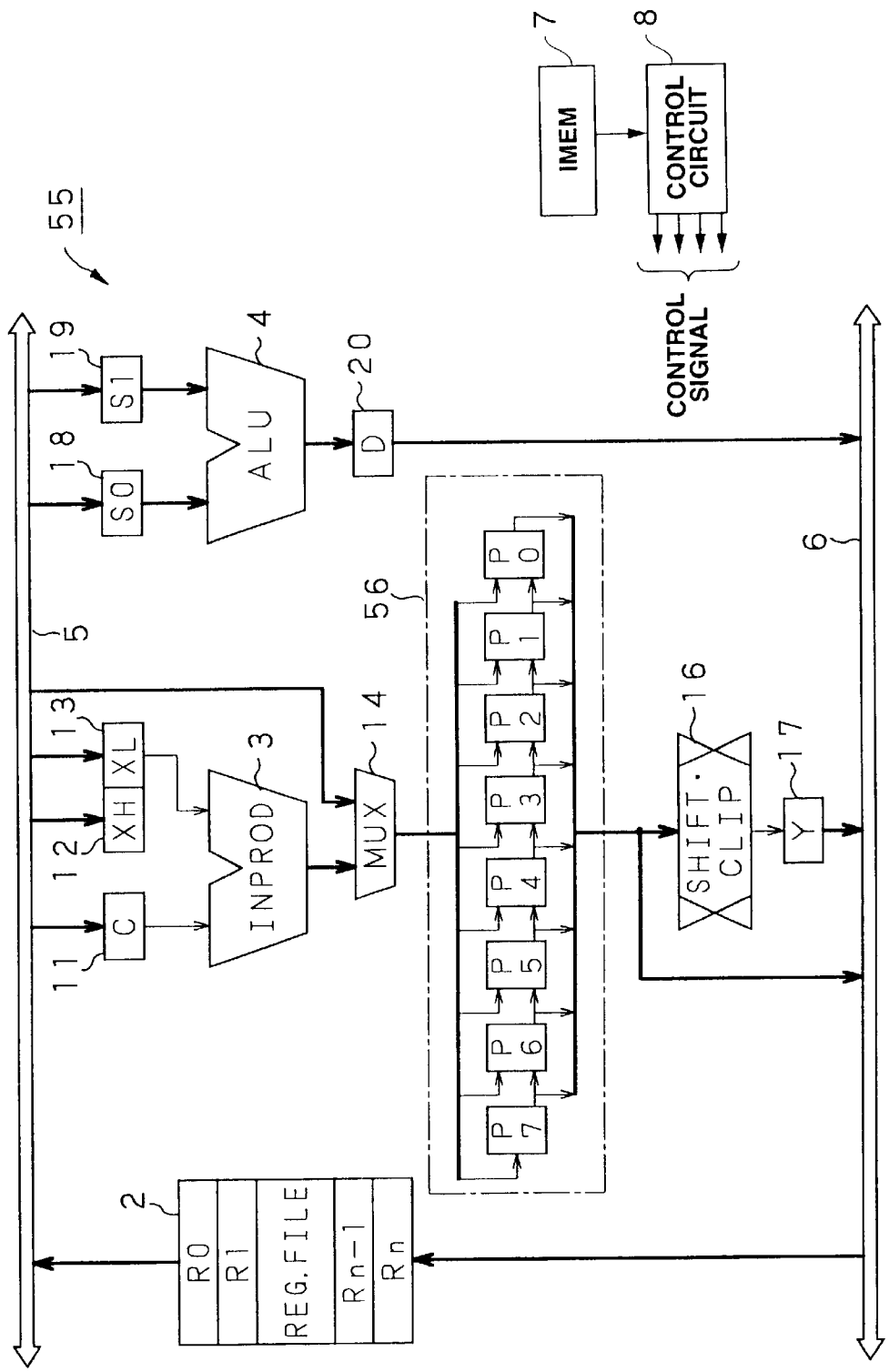
FIG. 32 is a block diagram of a sixth variant of the information processor according to the present invention.

FIG. 32 shows a sixth variant of the information processor 1. This information processor is generally indicated with a reference 55. The information processor 55 has an intermediate register 56 provided therein in place of the P register 15 provided in the information processor 1 and which stores a data divided in sub-words, supplied from the multiplexer 14. The intermediate register 56 has a shift-register structure in which a stored data divided in sub-words is shifted sub-word by sub-word. For example, in the intermediate register 56, a 64-bit word-long data supplied from the multiplexer 14 is divided into 8-bit sub-words and supplied to sub-registers P0 to P7, as shown in FIG. 32.

To arrange a data in the form of sub-words in order, an output from the multlexer 14 is supplied, for one sub-word only, to the MSB sub-resistor P7 of the intermediate register 56. By repeating this operation, data can be arranged in order and a similar data to a one provided from the Y register 17 can be provided from the intermediate register 56.

Thus in the information processor 55, a data is transferred from the intermediate register 56 to the register file 2 via the second data transfer bus 6. After data is subjected to an inner-product operation, it can be stored in the form of sub-words directly into the register file 2. Therefore, the information processor 55 has not to convert the data stored in the register file 2 back into the sub-word form, thereby permitting to omit the register file 2 and reduce the number of execution cycles.

Figure 33:
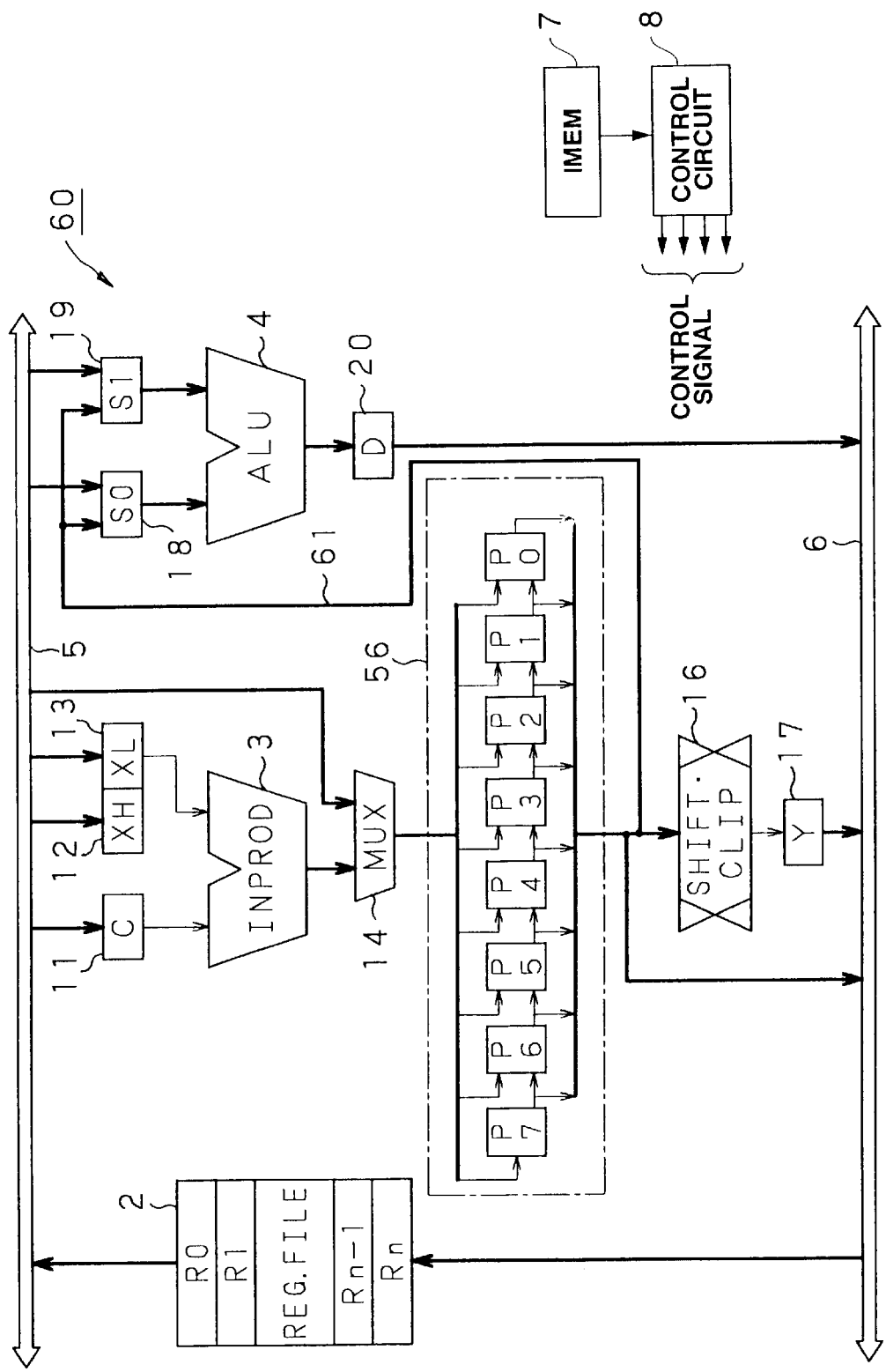
FIG. 33 is a block diagram of a seventh variant of the information processor according to the present invention.

A seventh variant of the information processor 1 is shown in FIG. 33. This information processor is generally indicated with a reference 60. As shown, the information processor 60 is a version of the information processor 55 (sixth variant) provided with a data transfer path 61 from the intermediate register 56 provided in the information processor 55 to the S0 and S1 registers 18 and 19. In the information processor 60, a data can be transferred from the intermediate register 56 to the S0 or S1 register 18 or 19 along the data transfer path 61, not via the register file 2. Therefore, in the information processor 60, the sub-word-long or word-long result of operation stored in the intermediate register 56 can be continuously processed by the ALU 4, so that the similar operations to those in the information processor 55 can be done and the number of execution cycles can be reduced.

Figure 34:
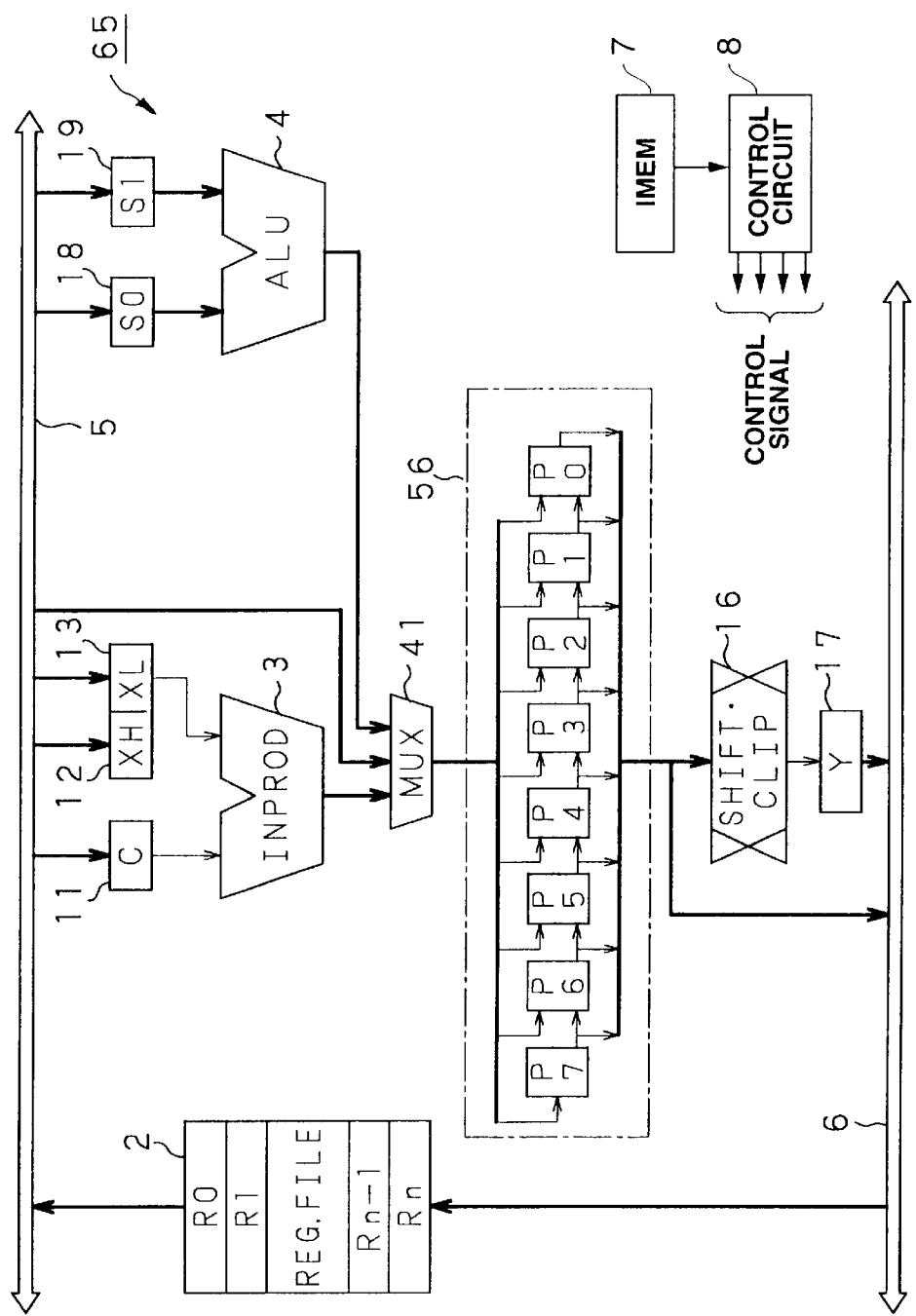
FIG. 34 is a block diagram of an eighth variant of the information processor according to the present invention.

An eighth variant of the information processor is shown in FIG. 34. This information processor is generally indicated with a reference 65. The information processor 65 has a multiplexer 41 provided therein in place of the multiplexer 14 provided in the information processor 55 (sixth variant) and which selects an output data from the INPROD unit 3, a data transferred via the first data transfer bus 5 or an output data from the ALU 4. The information processor 65 has not the D register 20. In this information processor 65, the result of operation from the ALU 4 is stored into the intermediate register 56, so that the result of operation from the ALU 4 can be processed with the operation with which the result of operation from the INPROD unit 3 is divided into sub-words. Thus, in the information processor 65, not only the result of inner-product operation but also all the results of operations provided in the form of a word cane converted directly to the form of sub-words for storage into the register file 2.

Figure 35:
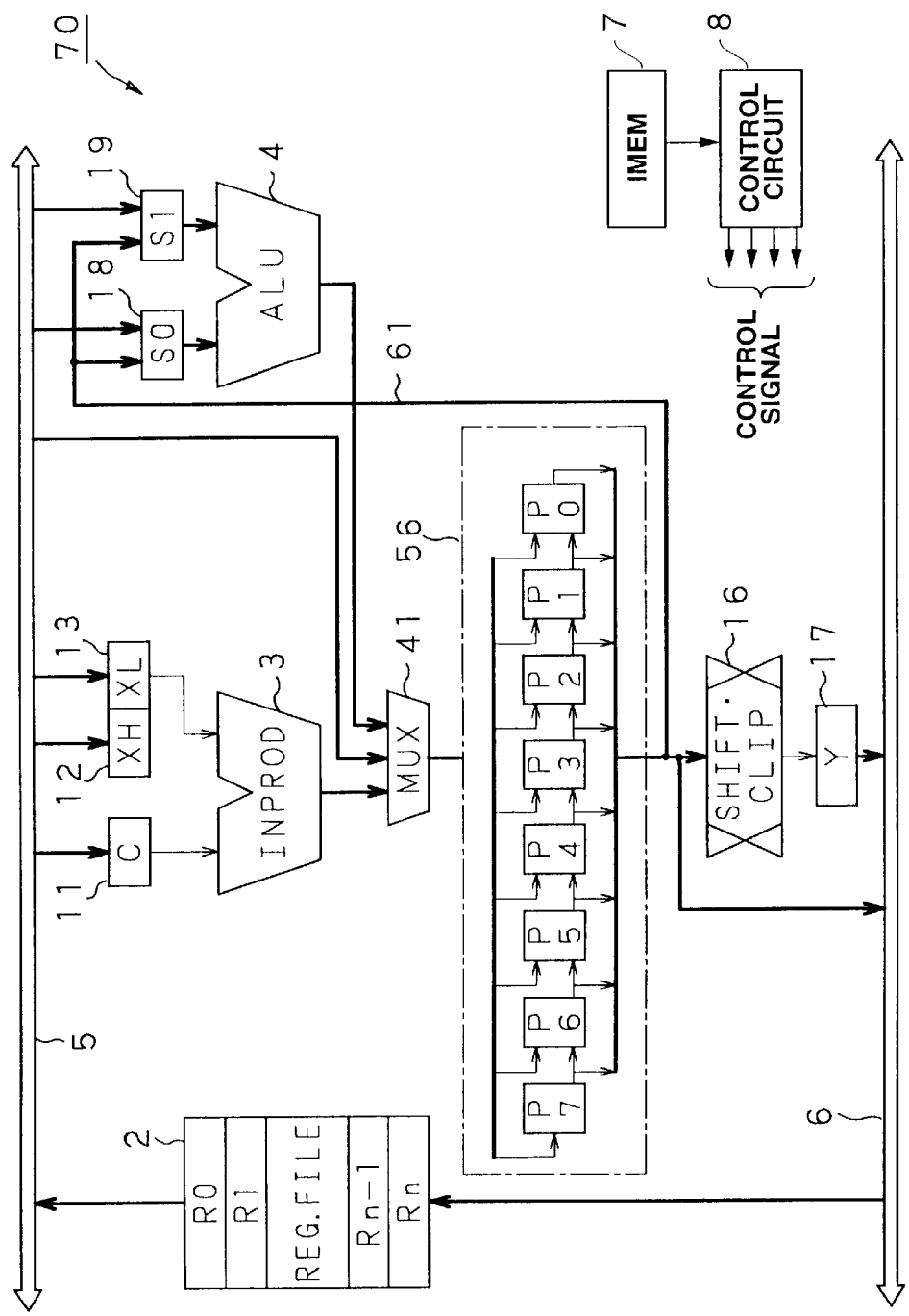
FIG. 35 is a block diagram of a ninth variant of the information processor according to the present invention.

A ninth variant of the information processor is shown in FIG. 35. This information processor is generally indicated with a reference 70. The information processor 70 has a multiplexer 41 provided therein in place of the multiplexer 14 provided in the information processor 55 (sixth variant) and which selects an output data from the INPROD unit 3, a data transferred via the first data transfer bus 5 or an output data from the ALU 4, and a data transfer path 61 from the intermediate register 65 to the S0 and S1 registers 18 and 19. That is, the information processor 70 is a version of the information processor 65 (eighth variant) provided with the data transfer path 61 of the information processor 60 (seventh variant). Thus in the information processor 70, the result of inner-product operation as well as all the results of operations provided each in the form of a word can be converted directly to sub-words for storage into the register file 2, and the result of operation stored in the form of a sub-word or word in the intermediate register 56 can be continuously processed by the ALU 4 within a reduced number of cycles.

As having been described in the foregoing, the information processor according to the present invention shifts a result of operation provided in units of a word length and then clipped, and the result of the clipping is stored into the output register as sub-words. Thus, after the arithmetic operation, the information processor can store the data in the form of sub-words directly into the register file. Therefore, the information processor has not to convert a data stored in the register file without conversion of the data back into sub-words. Thus, the register file may be omitted and the number of cycles can be reduced.

What is claimed is:

1. An information processor comprising:
   an arithmetic circuit to provide a result of arithmetic operation in units of a word length;
   an intermediate register to store the result of arithmetic operation supplied from the arithmetic circuit;
   a shifting circuit to shift the data stored in the intermediate register by an arbitrary number of bits;
   a clipping circuit to clip the data shifted by the shifting circuit to an arbitrary bit length; and
   an output register to store as a sub-word the data clipped by the clipping circuit and sequentially shift the existing data therein by one sub-word from the higher to lower bits each time a data is entered for storage as a sub-word.

2. The information processor as set forth in claim 1, further comprising a multiplexer to store the result of the clipping effected in the clipping circuit in units of the sub-word at arbitrary bit positions in the output register;
   the output register storing as a sub-word the result of the clipping effected in the shifting circuit.

3. The information processor as set forth in claim 1, wherein the arithmetic circuit includes an inner-product operational unit and an arithmetic logic unit.

4. The information processor as set forth in claim 3, further comprising:
   an input register to store a source data divided in sub-words; and
   an coefficient register to store a coefficient data divided in sub-words;
   the inner-product operational unit effecting an SIMD (single instruction multiple data stream) type inner-product operation of the source data stored in the input register and coefficient data stored in the coefficient register, in units of a sub-word.

5. The information processor as set forth in claim 3, further comprising a multiplexer to store the result of the clipping effected in the clipping circuit in units of a sub-word at arbitrary bit positions in the output register;
   the output register storing as a sub-word the result of the clipping effected in the clipping circuit.

6. The information processor as set forth in claim 3, further comprising a data transfer path from the output register to an input register of the arithmetic logic unit (ALU).

7. An information processor comprising:
   an input register to store a source data divided in sub-words;
   a coefficient register to store a coefficient data divided in sub-words;
   an inner-product operational unit to effect an inner-product operation of the source data stored in the input register and coefficient data stored in the coefficient register, in units of a sub-word, and provide the result of the operation in units of a word length;
   an intermediate register to store the result of the operation effected in the inner-product operational unit;
   a shifting unit to shift the data stored in the intermediate register by an arbitrary number of bits;
   a clipping circuit to clip the data of which the bit positions have been shifted by the shifting circuit to an arbitrary bit length; and
   an output register to store as a sub-word the data clipped by the clipping circuit, and sequentially shift the existing data therein by one sub-word from the higher to lower bits each time a data is entered for storage as a sub-word.

8. The information processor as set forth in claim 7, further comprising a multiplexer to store the result of the clipping effected in the clipping circuit in units of a sub-word at arbitrary bit positions in the output register;
   the output register storing as a sub-word the result of the clipping effected in the clipping circuit.

9. The information processor as set forth in claim 7, further comprising an arithmetic logic unit.

10. The information processor as set forth in claim 9, further comprising a data transfer path from the output register to an input register of the inner-product operational unit.

11. The information processor as set forth in claim 7, further comprising a control circuit to effect an instruction fetch, data storage to the input or coefficient register, first stage of execution, second stage of execution, and data write from the output register to an external buffer by a pipeline processing.

12. The information processor as set forth in claim 11, wherein the control circuit functions to:
    fetch an instruction; and
    load a coefficient data into the coefficient register.

13. The information processor as set forth in claim 11, wherein the control circuit functions to:
    fetch an instruction;
    load a coefficient data into the coefficient register; and
    zero, at the first stage of execution, the data for storage into the output register.

14. The information processor as set forth in claim 11, wherein the control circuit functions to:
    fetch an instruction;
    load a source data into the input register;
    make an inner-product operation, by the inner-product operational unit, of the source data stored in the input register and the coefficient data stored in the coefficient register, in units of a sub-word, and store the result of the inner-product operation into the intermediate register, at the first stage of execution;
    store the data stored in the intermediate register in units of a word length into the output register at the second stage of execution; and
    write the data stored into the output register into the external buffer.

15. The information processor as set forth in claim 11, wherein the control circuit functions to:
    fetch an instruction;
    load a source data into the input register;

make an inner-product operation, by the inner-product operational unit, of the source data stored in the input register and the coefficient data stored in the coefficient register, in units of a sub-word, and store the result of the inner-product operation into the intermediate register, on a first execution instruction;

shift, by the shifting circuit, the result of the inner-product operation stored in the intermediate register by an arbitrary number bits, while clipping the result of the shifting effected by the shifting unit to an arbitrary bit length, and store the data in the intermediate register in units of a sub-word into the output register, at the second stage of execution; and write the data stored in the output register into the external buffer.

16. The information processor as set forth in claim 11, wherein the control circuit functions to:

fetch an instruction;

shift the source data stored in the input register by one sub-word;

make an inner-product operation, by the inner-product operational unit, of the source data stored in the input register and the coefficient data stored in the coefficient register in units of a sub-word, and store the result of the inner-product operation into the intermediate register, at the first stage of execution;

shift the result of the inner-product operation stored in the intermediate register in units of a sub-word by the shifting circuit while shifting the data stored in the output register in units of a sub-word, clip the result of the inner-product operation shifted by the shifting circuit to the arbitrary bit length, and store the data in the intermediate register in units of a sub-word into the output register, at the second stage of execution; and write the data stored in the output register into the external buffer.

17. An information processor, comprising:

an arithmetic circuit to provide the result of an arithmetic operation in units of a word length, the arithmetic circuit having an inner-product operational unit and an arithmetic logic unit (ALU); and an output register to store the result of the arithmetic operation effected in the arithmetic circuit as a sub-word and sequentially shift the existing data therein from the higher to lower bits in units of a sub-word each time a data is entered for storage as a sub-word;

an input register to store a source data divided in sub-words; and a coefficient register to store a coefficient data divided in sub-words;

the inner-product operational unit effecting an SIMD (single instruction multiple data stream) type inner-product of the source data stored in the input register and coefficient data stored in the coefficient register in sub-words.

18. An information processor comprising:

an arithmetic circuit to provide the result of an arithmetic operation in units of a word length, the arithmetic circuit having an inner-product operational unit and an arithmetic logic unit (ALU);

an output register to store the result of the arithmetic operation effected in the arithmetic circuit as a sub-word and sequentially shift the existing data therein from the higher to lower bits in units of a sub-word each time a data is entered for storage as a sub-word; and a data transfer path from the output register to the input register of the arithmetic logic unit.

19. An information processor comprising:

an input register to store a source data divided in sub-words;

a coefficient register to store a coefficient data divided in sub-words;

an inner-product operational unit to effect an SIMD type inner-product operation, in units of a sub-word, of the source data stored in the input register and coefficient data stored in the coefficient register, and provide the result of the SIMD type inner product operation in units of a word length; and an output register to store as a sub-word the result of the SIMD type inner-product operation effected in the inner-product operational unit and sequentially shift the existing data therein from the higher to lower bits in units of a sub-word each time a data is entered for storage as a sub-word.

20. The information processor as set forth in claim 19, further comprising an arithmetic logic unit (ALU).

21. The information processor as set forth in claim 20, further comprising adata transfer path from the output register to the input register of the ALU.

* * * * *